United States Patent [19]

Katoh et al.

[11] Patent Number: 5,268,565
[45] Date of Patent: Dec. 7, 1993

[54] COMPACT TYPE BAR CODE READER

[75] Inventors: Hiroaki Katoh, Sagamihara; Yoshitaka Murakawa, Fuchu; Toshimasa Miyazaki, Yamato; Nobuyuki Kitamura, Zama; Tamotsu Takahashi, Shiki; Takeshi Ishii, Ichikawa; Yoshihiro Oyama, Koriyama; Tatsuo Sasaki, Tokyo; Shinichi Sato, Kawasaki; Kazumasa Moriya, Urawa, all of Japan

[73] Assignee: Fujitsu Limited, Kawasaki, Japan

[21] Appl. No.: 899,044

[22] Filed: Jun. 16, 1992

Related U.S. Application Data

[63] Continuation of Ser. No. 598,427, Oct. 16, 1990, abandoned.

[30] Foreign Application Priority Data

| Oct. 16, 1989 | [JP] | Japan | 1-268411 |
|---|---|---|---|
| Oct. 16, 1989 | [JP] | Japan | 1-268412 |
| Oct. 16, 1989 | [JP] | Japan | 1-268413 |
| Oct. 16, 1989 | [JP] | Japan | 1-268414 |
| Oct. 16, 1989 | [JP] | Japan | 1-268415 |
| Oct. 16, 1989 | [JP] | Japan | 1-268417 |
| Oct. 16, 1989 | [JP] | Japan | 1-268422 |

[51] Int. Cl.[5] .................................... G06K 7/10
[52] U.S. Cl. ........................... 235/467; 235/462
[58] Field of Search .............. 235/467, 462, 472; 250/236, 237 R; 350/6.5, 6.7; 359/212, 216, 218, 219

[56] References Cited

U.S. PATENT DOCUMENTS

| 4,006,343 | 2/1977 | Izura et al. | 235/467 |
|---|---|---|---|
| 4,084,092 | 4/1978 | Runciman | 350/6.8 |
| 4,413,878 | 11/1983 | Lettington | 350/6.5 |
| 4,458,982 | 7/1984 | Blain et al. | 350/6.7 |
| 4,662,709 | 5/1987 | Brueggemann | 350/6.7 |
| 4,733,072 | 3/1988 | Lettington | 250/236 |
| 4,753,498 | 6/1988 | Saitoh et al. | 350/6.7 |
| 4,795,224 | 1/1989 | Goto | 350/6.3 |
| 4,799,164 | 1/1989 | Hellekson et al. | 350/6.2 |
| 4,938,551 | 7/1990 | Matsumoto | 235/467 |
| 4,953,925 | 9/1990 | Parker | 350/6.7 |
| 5,000,529 | 3/1991 | Katok et al. | 250/236 |

FOREIGN PATENT DOCUMENTS

| WO89/06787 | 7/1989 | European Pat. Off. . | |
|---|---|---|---|
| 0235915 | 9/1989 | Japan | 350/6.7 |
| 2198858A | 3/1985 | United Kingdom . | |

Primary Examiner—Eugene R. LaRoche
Assistant Examiner—Tan Nguyen
Attorney, Agent, or Firm—Staas & Halsey

[57] ABSTRACT

A compact type bar code reader for detecting a bar code symbol provided on a surface of an article. The bar code reader includes a laser beam generation unit for generating the laser beam to be irradiated onto a bar code symbol, and a focus unit for determining a focus of the laser beam, and a scanning pattern forming unit for forming various scanning patterns of the laser beam. The bar code reader also includes a light reflection unit for reflecting the laser beam to and from the bar code symbol, a light collection unit for collecting the laser beam reflected from the bar code symbol, and a light reception unit for receiving the laser beam collected by the light collection unit, and converting it to an electrical signal. The above units are included in a casing so that the laser beam generation unit, the focus unit, the light collection unit, and the light reception unit are arranged at a lower portion of the casing, and the scanning pattern forming unit and light reception unit are arranged at a lower portion of the casing. The light path of the laser beam is formed in such a way that an emitted light path from the laser beam generation unit to the bar code symbol becomes considerably long, and a reflected light path from the bar code symbol to the light reception unit becomes shorter than the emitted light path.

15 Claims, 31 Drawing Sheets

8: REFLECTION MIRROR
6: POLYGONAL MIRROR
S: SCANNING PATTERN

EMISSION LIGHT

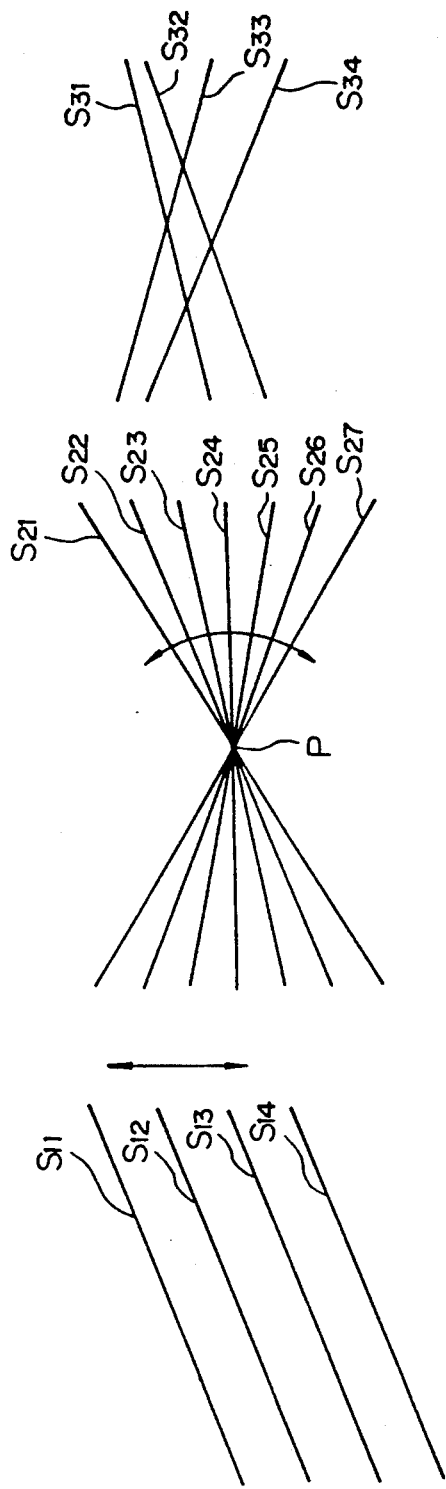

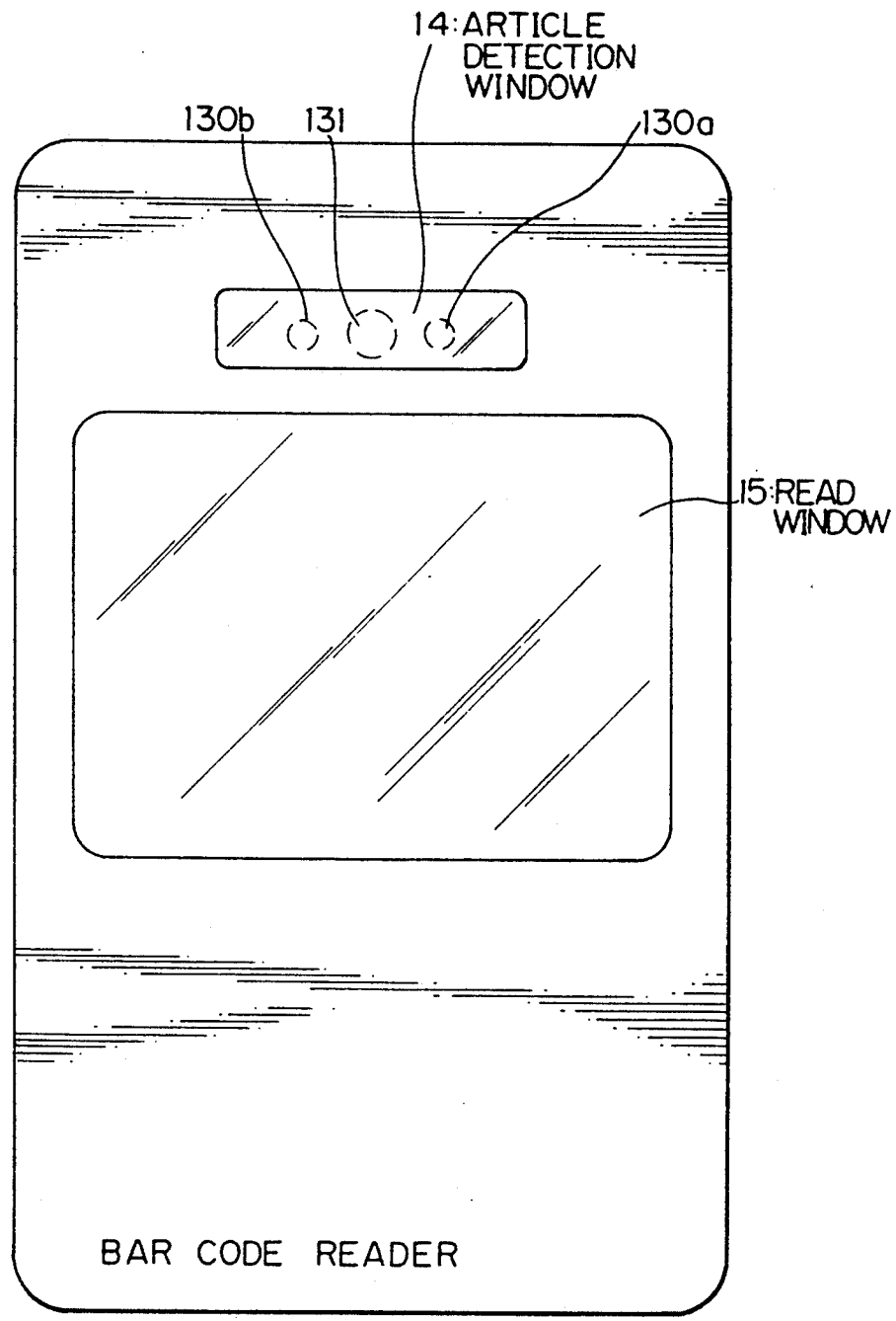

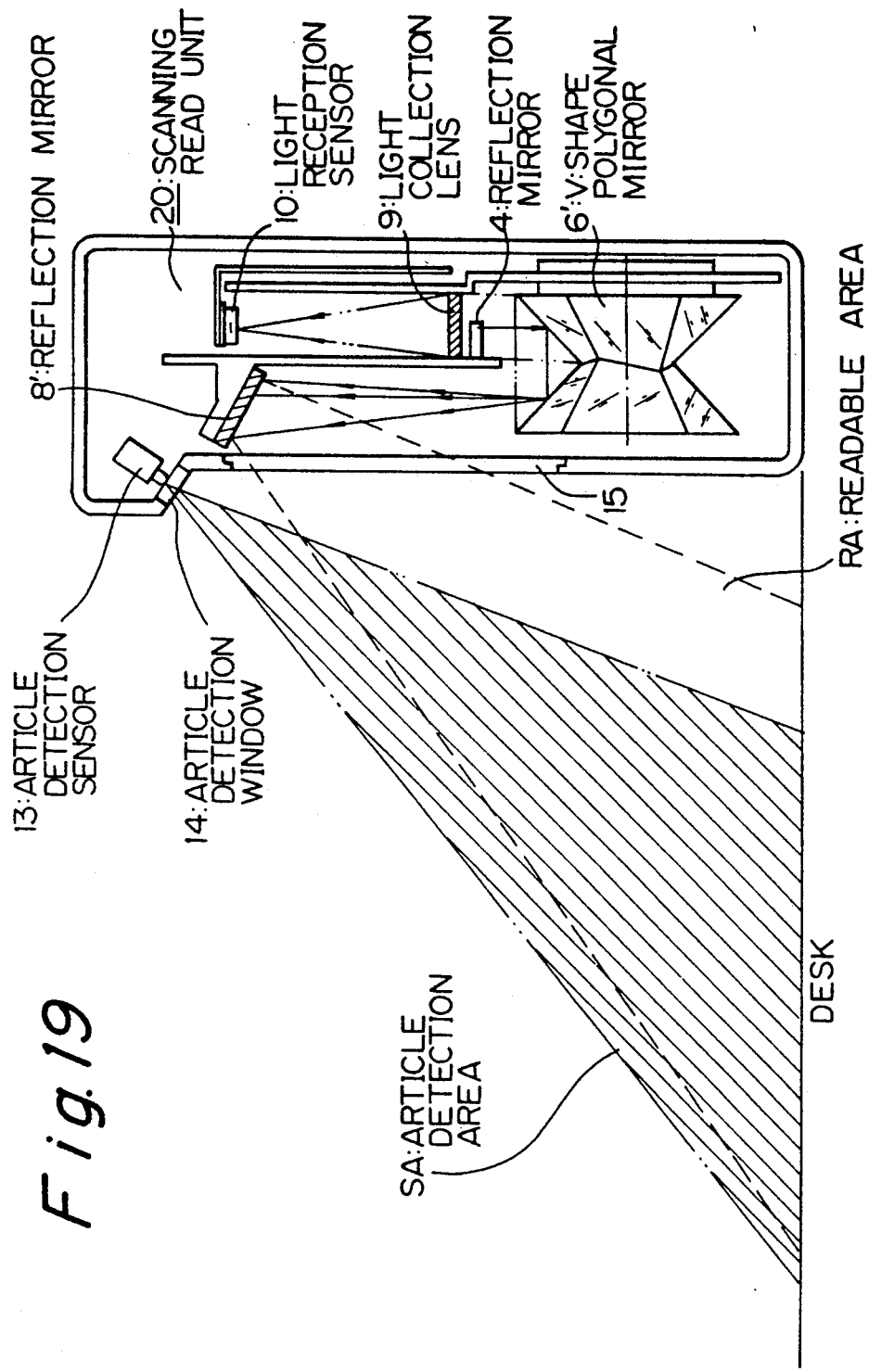

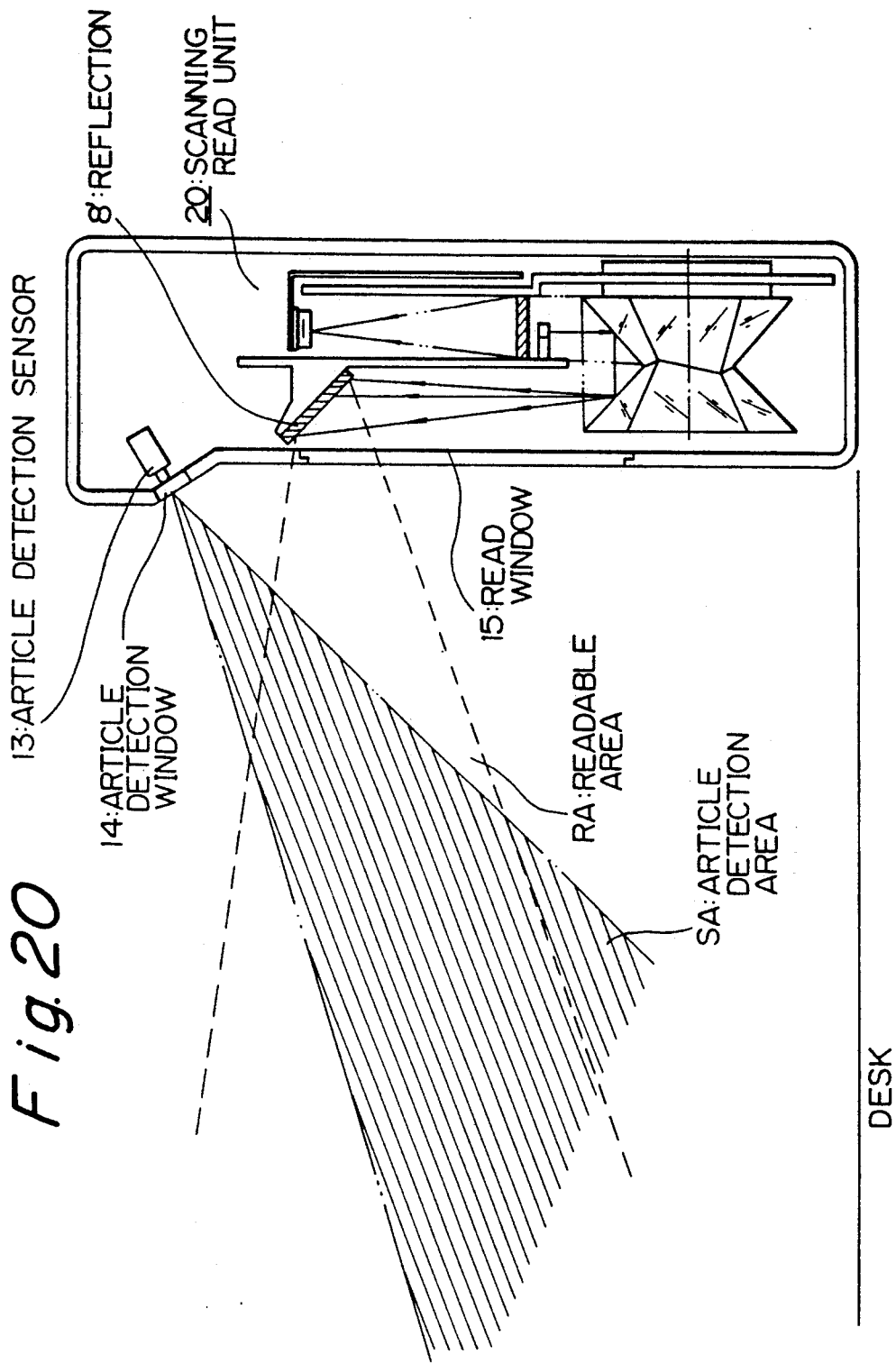

- 6b: UPPER REFLECTION UNIT
- 6a: LOWER REFLECTION UNIT
- 23: EVAPORATION SOURCE

- 6': V-SHAPE POLYGONAL MIRROR
- 6b: UPPER REFLECTION UNIT
- 6a: LOWER REFLECTION UNIT

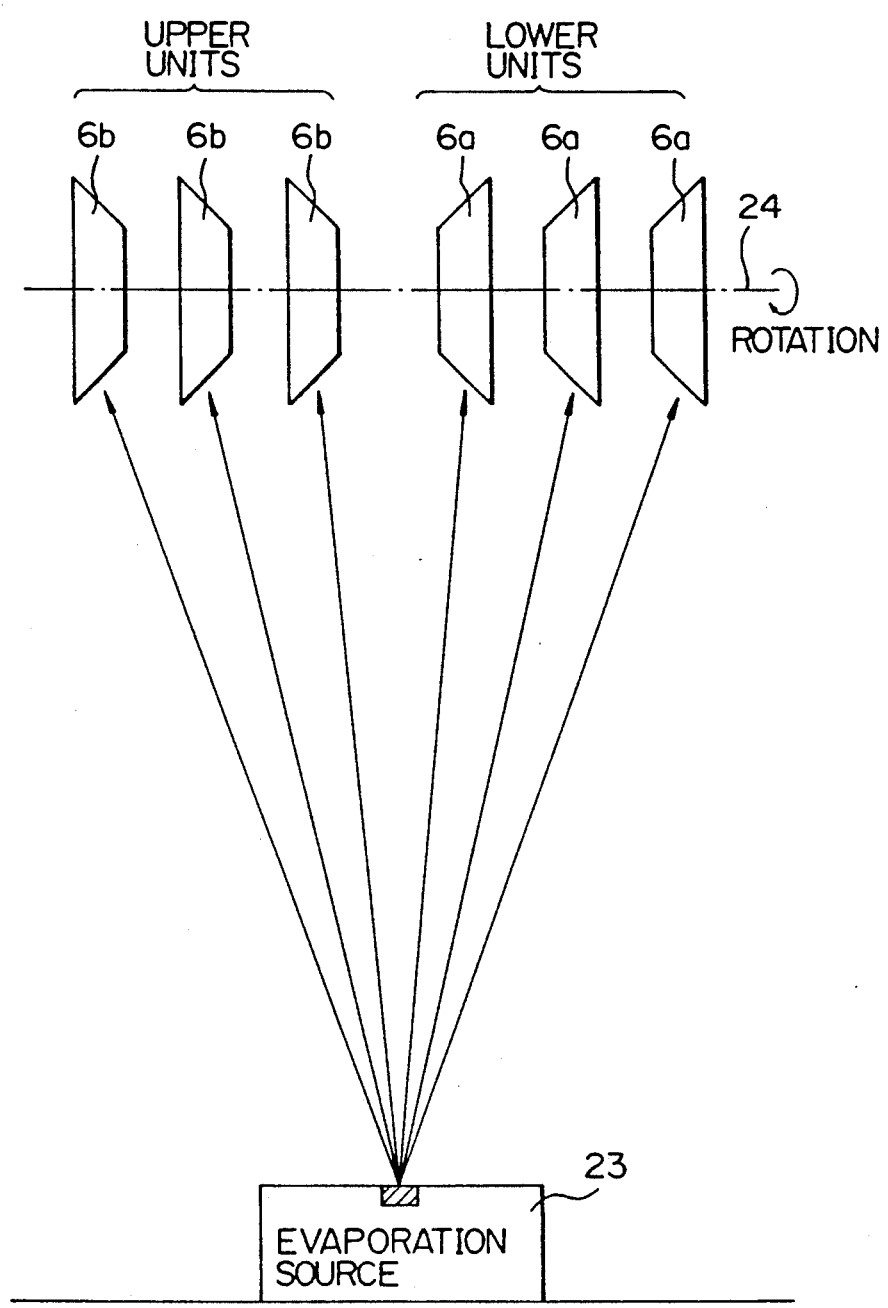

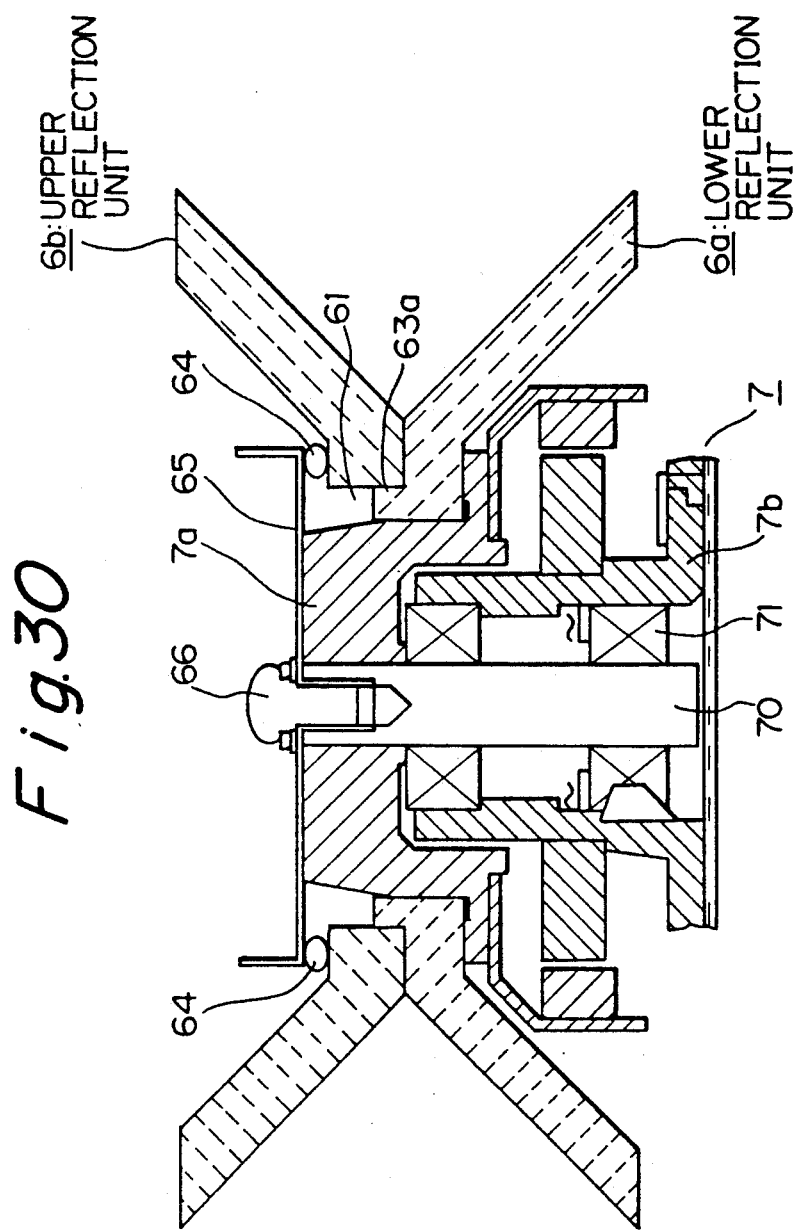

COMPACT TYPE BAR CODE READER

This application is a continuation of application Ser. No. 07/598,427, filed Oct. 16, 1990, now abandoned.

BACKGROUND OF THE INVENTION

1. Field of the Invention

The present invention relates to a bar code reader. More particularly, it relates to a compact type bar code reader which can be put on a desk and enables highly precise detection of a bar code symbol regardless of the direction of entry of an article (goods).

2. Description of the Related Art

Recently, bar code readers are widely utilized for management of goods in POS (Point Of Sales) system. In general, there are two types of bar code readers, i.e., an installed type and a handheld type. The former is installed, for example, into the counter of a large store. This type has a plurality of scanning beams which are irradiated onto the bar code symbol so that it has highly precise detection of the bar code regardless of the entry direction of goods. In general, however, this type of bar code reader is very large and occupies a large amount of space in the counter.

The handheld type bar code reader is small and used in relatively small stores. This type has only one scanning beam to be irradiated onto the bar code symbol. With this type, however, an operator must handle the goods to locate the bar code.

Accordingly, a compact type bar code reader which can be installed, for example, in a counter, and having the same performance as the large type is desired for use in POS systems.

SUMMARY OF THE INVENTION

The object of the present invention is to provide a compact type bar code reader enabling highly precise detection of a bar code symbol regardless of the direction of entry of an article (goods).

In accordance with the present invention, there is provided a compact type bar code reader for detecting a bar code symbol provided on the surface of an article, including: a laser beam generation unit for generating a laser beam to be irradiated onto a bar code symbol; a focus unit for determining a focus of the laser beam; a scanning pattern forming unit for forming various scanning patterns of the laser beam; a light reflection unit for reflecting the laser beam to and from the bar code symbol; a light collection unit for collecting the laser beam reflected from the bar code symbol; and a light reception unit for receiving the laser beam collected by the light collection unit, and converting it to an electrical signal. An arrangement of the above units in a casing comprises: the laser beam generation unit, the focus unit, the light collection unit, and the light reception unit being arranged at a lower portion of the casing; and the scanning pattern forming unit and light reflection unit being arranged at an upper portion of the casing; thereby, a light path of the laser beam is formed in such a way that an emitted light path from the laser beam generation unit to the bar code symbol becomes substantially long, and a reflected light path from the bar code symbol to the light reception unit becomes shorter than the emitted light path, and the light path is not interrupted by the light collection unit.

In one embodiment, the scanning pattern forming unit comprises a V-shape polygonal mirror constituted by a lower reflection unit and an upper reflection unit, the lower reflection unit being positioned at the lower portion of the casing, and the upper reflection unit being positioned at the upper portion of the casing.

In another embodiment, the lower reflection unit and the upper reflection unit comprise a plurality of reflection surfaces, each of the upper reflection surfaces and lower reflection surfaces are intersected so as to form a V-shape having an intersection angle, and inclined between the upper reflection surfaces and the lower reflection surfaces so as to form an inclination angle.

In still another embodiment, the light reflection unit comprises a multi-face reflection mirror constituted by at least two reflection mirrors to form various scanning pattern directions.

In still another embodiment, the compact type bar code reader further comprises at least two light emission elements, and a light reception element these elements being provided in the casing and arranged in such a way that an article detection area defined by these elements overlaps a bar code symbol readable area defined by the laser beam.

In still another embodiment, at least two light emission elements are arranged in such a way that light emission areas between these elements are overlapped with each other.

In still another embodiment, the compact type bar code reader further comprises: a scanning read unit for generating the laser beam, receiving the laser beam reflected from the bar code symbol, and demodulating the reflected laser beam, thereby performed a read operation; an article detection unit for generating a detection light to be irradiated onto the article, receiving the detection light reflected from the article; and a control unit for generating an emission stop signal to the article detection unit, receiving an article detection signal from the article detection unit, and generating a scanning start/stop signal to the laser beam generation unit. The control unit controls the operation of the other units in such a way that, first, the detection light is emitted to the article; second, the laser beam is started after the article detection signal is received; third, the detection light is stopped during irradiation of the laser beam; fourth, the laser beam is stopped when the read operation is completed; and finally, the detection light is again emitted to detect a next article.

In still another embodiment, the scanning read unit comprises, a laser beam scanner coupled to the control unit, for generating various laser beam scanning patterns, a light collection circuit for collecting the laser beam, a detector for detecting the laser beam, and a demodulation circuit for demodulating the reflected laser beam.

In still another embodiment, the article detection unit comprises a light emission element, a light reception circuit, a light change detection circuit coupled to the light reception circuit, for detecting the change of the amount of the reception light, and a clock pulse generation circuit coupled to the light change detection circuit, for generating clock pulses which are used to obtain a pulsed detection light.

In still another embodiment, the control unit comprises a central processing unit for controlling the operation of the units, and a read time control timer for timing the irradiation time of the laser beam.

In still another embodiment, the V-shape polygonal mirror is manufactured in such away that the V-shape polygonal mirror is divided into the upper reflection unit and the lower reflection unit, each surface of the upper and lower reflection units are separately coated by a metal film evaporated from an evaporation source, and the upper and lower reflection units are assembled to each other after evaporation of the metal film.

In still another embodiment, the division of the upper and lower reflection units is done along a horizontal separation line between the upper and lower reflection units.

In still another embodiment, the V-shape polygonal mirror further comprises a polygon motor to rotate the V-shape polygonal mirror; the polygon motor is constituted by a rotation axle, a rotor fixed to the rotation axle, a stator, and a bearing mounted between the rotation axle and the stator; the rotor is mounted to the outer side of the stator, and the upper and the lower reflection units are mounted to the outer side of the rotor.

In still another embodiment, the assembly of the V-shape polygonal mirror and the polygon motor is performed in such a way that first, the rotation axle is mounted to the stator through the bearing; second, the rotor is mounted to the rotation axle by a screw; third, the lower reflection unit is mounted onto the stator; fourth, the upper reflection unit is mounted onto the lower reflection unit through a coupling hole and a projection; and finally, a flat spring is mounted to the rotation axle by the screw, and at the same time, a rubber spacer is provided between the upper reflection unit and the flat spring.

BRIEF DESCRIPTION OF THE DRAWINGS

FIGS. 13A to 13C are views for explain change of the scanning pattern based on the intersection and inclination angles;

FIG. 18 is a schematic elevation view of the compact type bar code reader shown in FIG. 15;

FIG. 19 is a detailed view of the article detection area and the readable area;

FIG. 20 is a view for explaining another example of the readable area shown in FIG. 19;

FIG. 29 is a view for explaining the evaporation process;

FIG. 30 is a sectional view after assembly of the V-shape polygonal mirror and the polygon motor;

DESCRIPTION OF THE PREFERRED EMBODIMENTS

Before describing the preferred embodiments explanation will be given of the conventional art.

Figure 1:
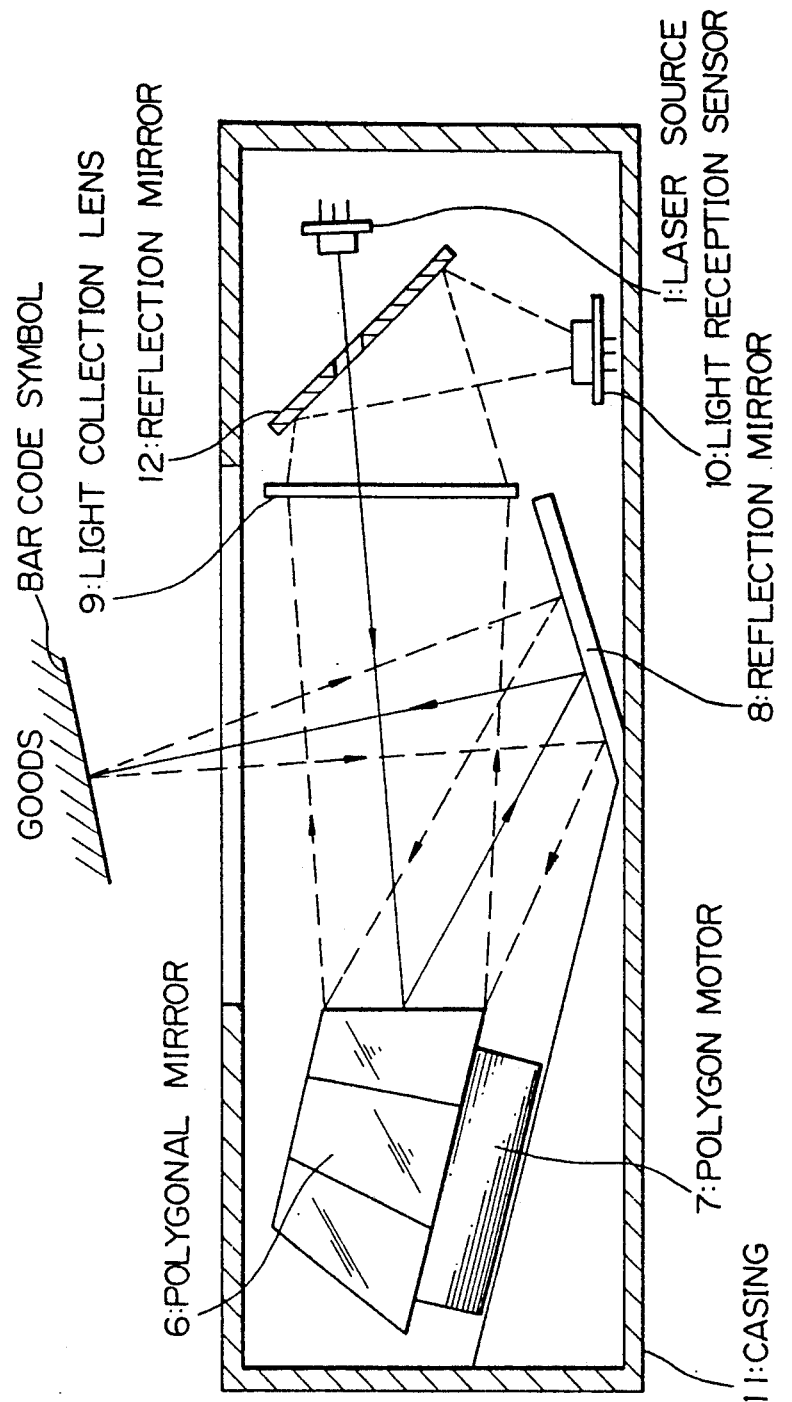
FIG. 1 is a schematic sectional view of a conventional compact type bar code reader.

FIG. 1 is a schematic sectional view of a conventional compact type bar code reader. In FIG. 1, reference number 1 denotes a semiconductor laser beam generation source, 6 denotes a polygonal mirror which may be considered a scanning pattern forming means, 7 denotes a polygon motor, 8 denotes a reflection mirror, 9 denotes a light collection lens, 10 denotes a light reception sensor, 11 denotes a casing, and 12a denotes a reflection mirror.

The polygonal mirror 6 is rotated by the polygon motor 7 to form various scanning patterns. The laser beam emitted from the laser source 1 is reflected by the polygonal mirror 6, reflected by the reflection mirror 8, and then irradiated onto the bar code symbol.

The laser beam reflected from the bar code symbol is reflected by the reflection mirror 8, reflected by the polygonal mirror 6, collected by the light collection lens 9, again reflected by the reflection mirror 12, and then received by the light reception sensor 10. The received light is then converted to an electrical signal.

Figures 2A, 2B, 2C:
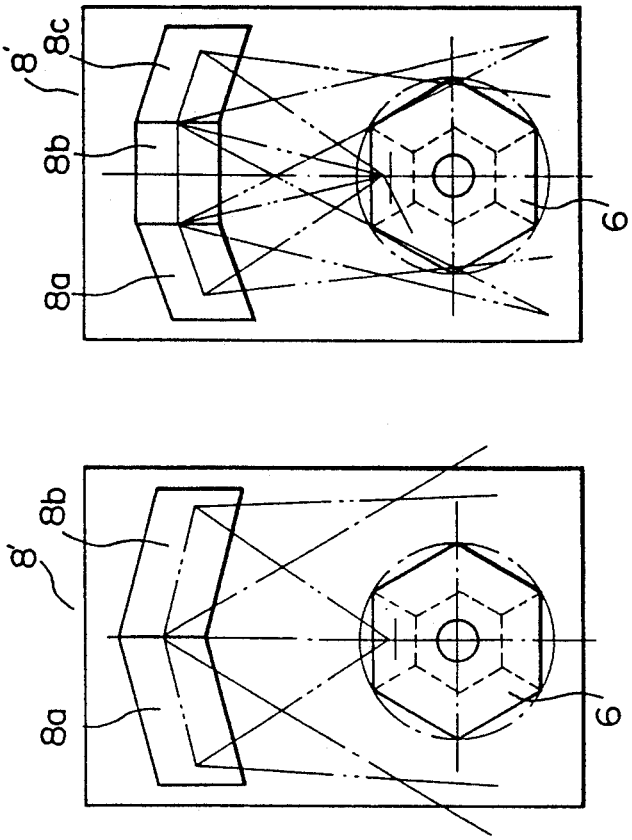
FIGS. 2A to 2C are views for explaining the relationship between a scanning pattern and a reflection mirror.

FIGS. 2A to 2C are views for explaining the relationship between a scanning pattern and reflection mirror. In FIGS. 2A to 2C, 8a to 8c denote reflection mirrors, and S1 to S3 denote scanning patterns. In FIG. 2A, only one reflection mirror 8 is provide so that the scanning pattern is in one direction. In FIG. 2B, two reflection mirrors are provided so that the scanning pattern is in two directions. In FIG. 2C, three reflection mirrors are provided so that the scanning pattern is in three directions. Accordingly, the number of scanning pattern directions depends on the number of reflection mirrors.

Problems in the conventional art shown in FIGS. 1 and 2A to 2C will be explained below.

In general, it is necessary to provide a light path distance between the polygonal mirror 6 and the bar code symbol as great as possible to ensure that the scanning patterns each have sufficient length. Accordingly, the distance between the polygonal mirror 6 and the reflection mirror 8 must be made as large as to satisfy the above requirement as shown in FIG. 1. As a result, the size of the bar code reader becomes large to ensure sufficient distance of the light path.

Further, the size of the light collection lens 9 becomes large because it must be provided at a location where it does not interrupt the light path of the emission light. As a result, the overall size of the bar code reader also becomes large, thus limiting the areas in which it can be located.

As is obvious from the drawing, both the distances of an emitted light path (from the laser beam source to the bar code symbol) and a reflected light path (from the bar code symbol to the light reception element) are large in the conventional art. Ideally, the emitted light path should be large and the reflected light path should be shorter than the emitted light path.

Still further, in general it is necessary to provide as many scanning pattern directions (i.e. a number of directions of the scanning pattern) as possible to improve the precision of the detection of the bar code symbol. As explained in FIGS. 2A to 2C, since number of the scanning pattern directions depends on number of reflection mirror, it is necessary to provide as many reflection mirrors as possible. However, as shown in FIGS. 2B and 2C, the greater the number of reflection mirrors, the shorter the length of the scanning pattern. As explained above, an adequately long scanning pattern is necessary to ensure precise detection of the bar code symbol. Accordingly, it is necessary to provide larger mirrors to ensure a sufficient length of the scanning pattern. As a result, the overall size of the bar code reader also increases.

Accordingly, the object of the present invention is to solve the above problems.

A compact type bar code reader according to the present invention is explained in detail hereinafter.

Figure 3:
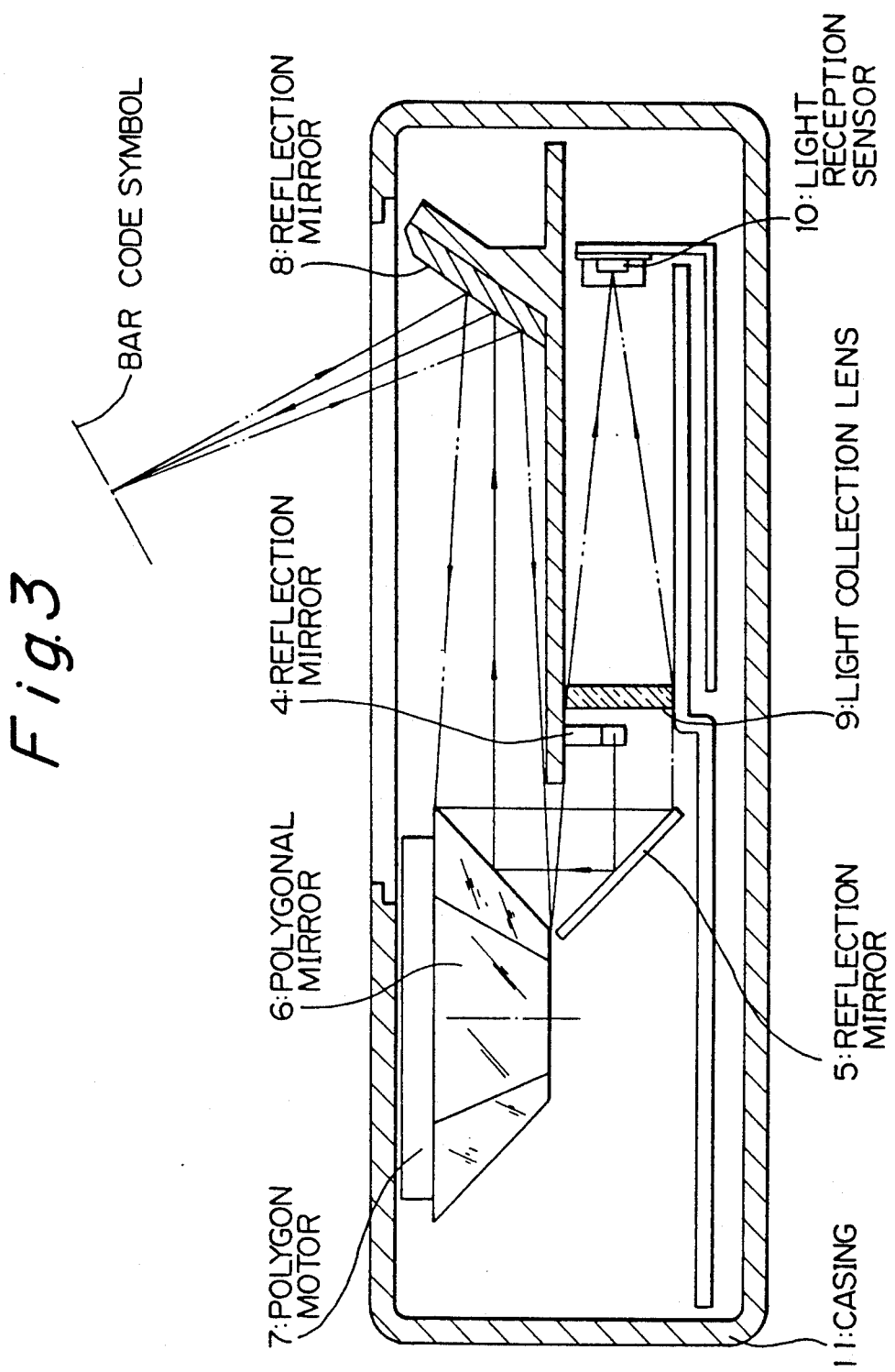
FIG. 3 is a schematic sectional view of a compact type bar code reader according to an embodiment of the present invention.
Figure 4:
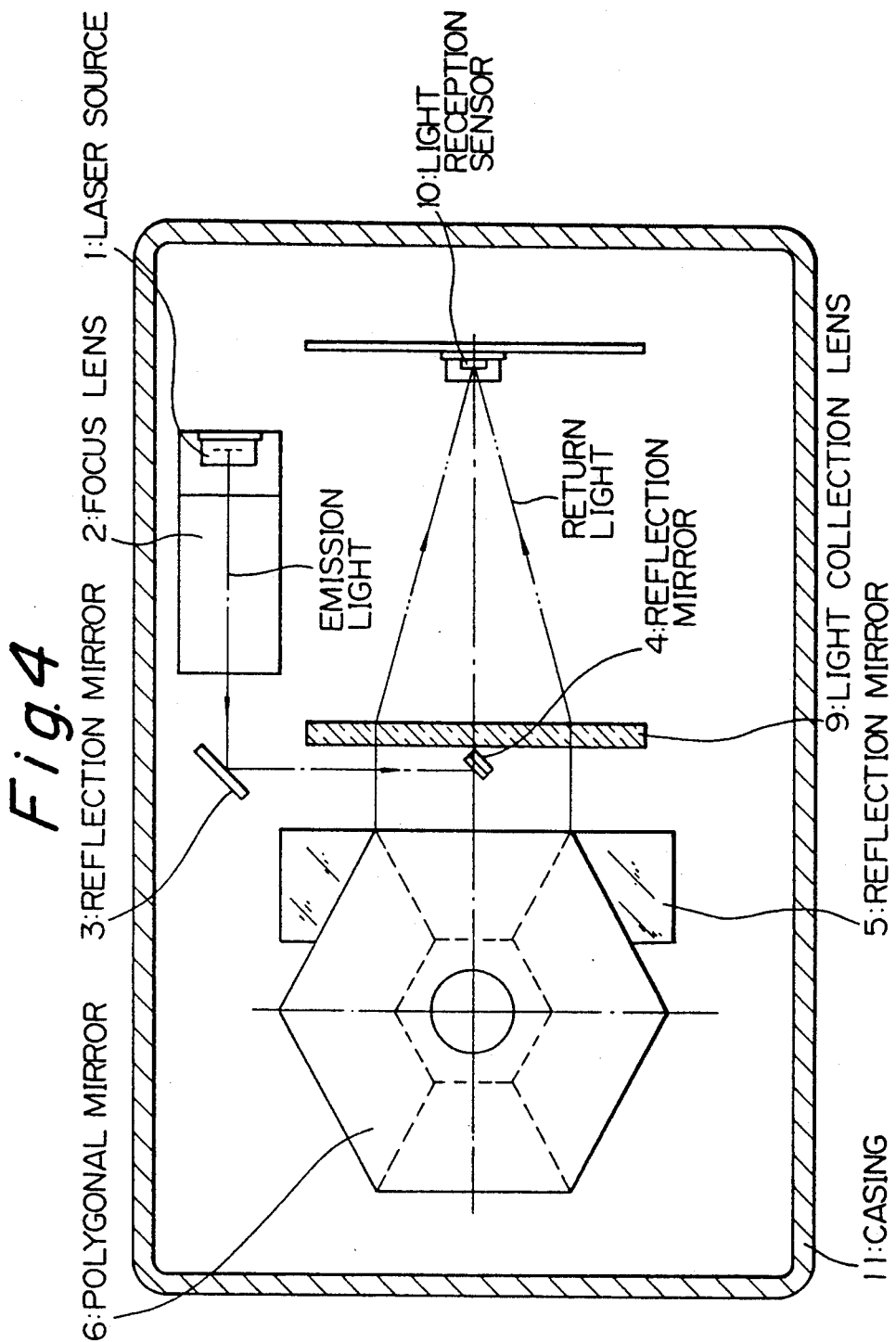
FIG. 4 is an upper view of the embodiment of FIG. 3.

FIG. 3 is a schematic sectional view of a bar code reader according to an embodiment of the present invention. FIG. 4 is an upper view of FIG. 3. In FIGS. 3 and 4, the same reference numbers as used in FIG. 1 are attached to the same components in these drawings. In FIG. 3, reference numbers 4 and 5 denote reflection mirrors. In FIG. 4, reference number 2 denotes a focus lens for focusing the laser beam, and 3 denotes a reflection mirror.

As shown in FIGS. 3 and 4, the laser source 1, focus lens 2, the reflection mirrors 3 to 5, the light collection lens 9, and light reception sensor 10 are arranged at the lower portion of the casing 11, while the polygonal mirror 6 and the reflection mirror 8 are arranged at the upper portion of the casing 11. Accordingly, the laser beam from the laser source 1 is reflected by the reflection mirrors 3, 4, and 5, and further reflected by the polygonal mirror 6 and the reflection mirror 8 , and then irradiated onto the bar code symbol. The laser beam reflected from the bar code symbol is reflected by the reflection mirror 8, the polygonal mirror 6 and the reflection mirror 5, and then collected by the light collection lens 9, and received by the light reception sensor 10. Accordingly, the reflection mirror 5 is used for forming the light path between the upper portion and the lower portion of the bar code reader.

Based on the above arrangement of the components, it is possible to ensure a long emitted light path and a short reflected light path. Further, it is possible to provide a light collection lens 9 which is small in size because it does not interrupt the emitted light path. Also, compactness of the compact type bar code reader of FIG. 3 is achieved by providing part of the emitted light path in common with (i.e., along the same path as) part of the reflected light path from the reflected mirror 4 to the bar code symbol via reflection mirror 5, polygonal mirror 6 and reflection mirror 8. As a result, it is possible to produce a compact type bar code reader based on the above arrangement of each element.

Figure 5A:
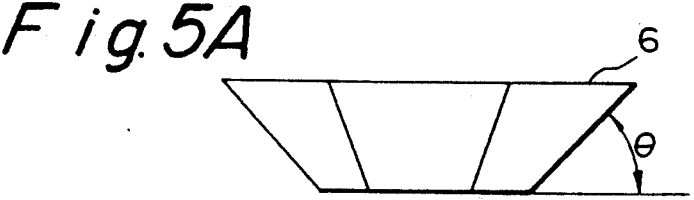
FIGS. 5A to 5C are views for explaining scanning patterns.
Figure 5B:
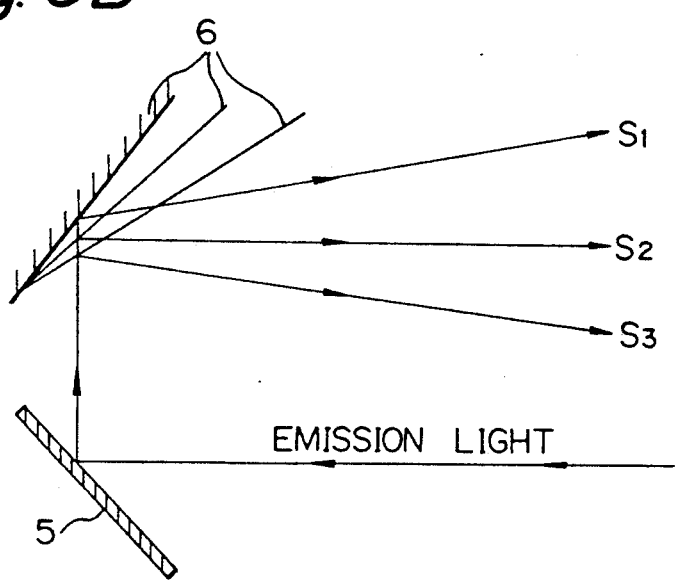
Figure 5C:
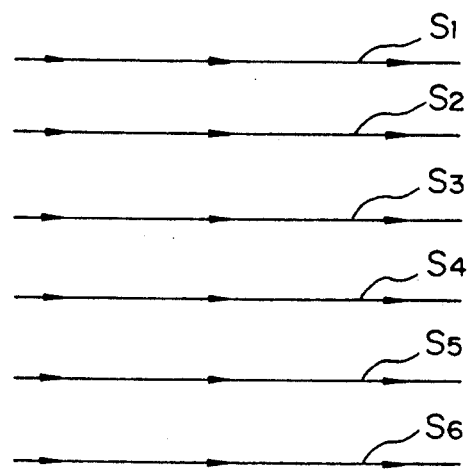

FIGS. 5A to 5C are views for explaining scanning patterns in FIG. 5A, the polygonal mirror 6 has six reflective surfaces each having a different angle $\theta$ so that six different reflection angles are formed as shown in FIG. 5B. Accordingly, it is possible to provide six kinds of parallel scanning patterns as shown in FIG. 5C.

Figure 6:
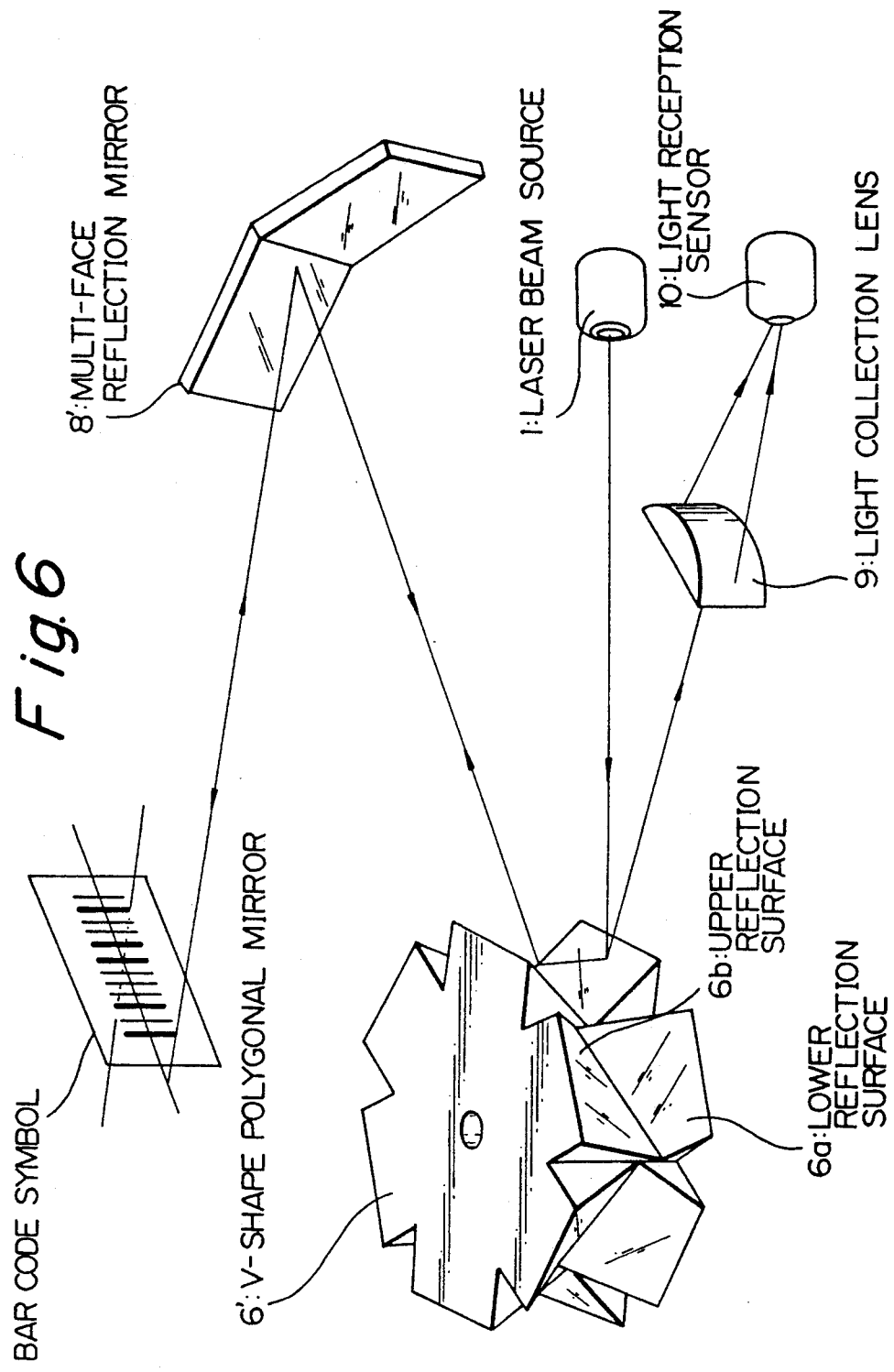
FIG. 6 is a basic structural view of a compact type bar code reader according to another embodiment of the present invention.

FIG. 6 is a basic structural view of a compact type bar code reader according to another embodiment of the present invention. In FIG. 6, reference number 6' denotes a V-shape polygonal mirror having a lower reflection surface 6a and an upper reflection surface 6b, and 8' denotes a multi-face reflection mirror having at least two reflection mirrors. The laser beam from the beam source 1 is reflected by the lower reflection surface 6a, reflected by the upper reflection surface 6b, and reflected by the multi-face reflection mirror 8' and then irradiated onto the bar code symbol. The laser beam reflected from the bar code symbol is reflected by the multi-face reflection mirror 8', reflected by the upper reflection surface 6b, reflected by the lower reflection surface 6a, and then collected by the light collection lens 9, and finally received by the light reception sensor 10.

In this embodiment, although an explanation will be given in detail below, briefly, the V-shape polygonal mirror 6' is used instead of the polygonal mirror 6 and the reflection mirror 5 shown in FIG. 3, and multi-face reflection mirror 8' is used instead of the reflection mirror 8.

As a result, it is possible to obtain a plurality of scanning patterns having various directions by using the V-shape polygonal mirror 6'. In this case, the number of directions corresponds to the number of faces of the V-shape polygonal mirror 6'. Further, it is possible to obtain a plurality of scanning patterns by using the multi-face reflection mirror 8'. Accordingly, it is possible to obtain many kinds of scanning patterns by using a set comprised of the V-shape polygonal mirror 6' and the multi-face reflection mirror 8'.

Figure 7A:
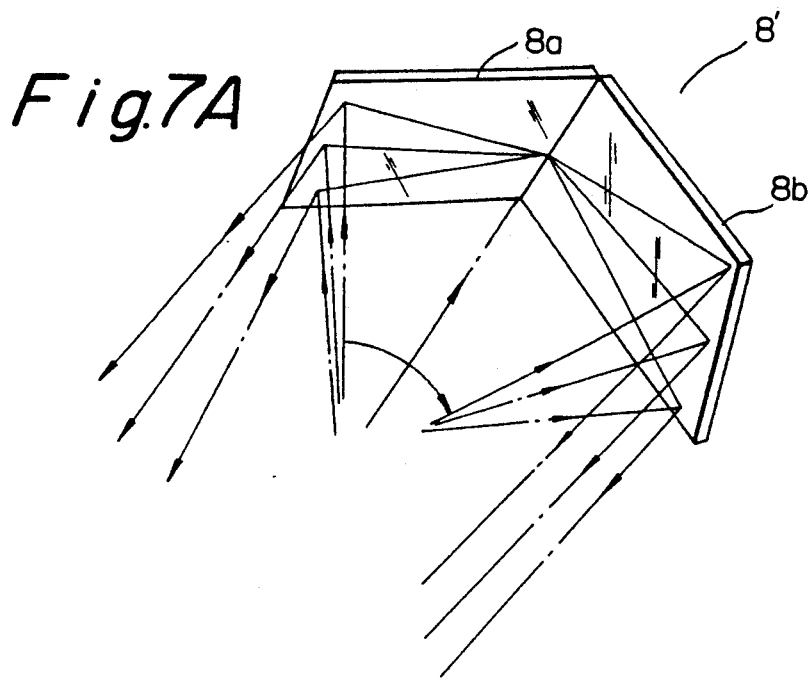
FIGS. 7A to 7C, and FIGS. 8A to 8C are views for explaining scanning patterns formed by the multi-face reflection mirror.

FIGS. 7A to 7C, and 8A to 8C are views for explaining scanning patterns formed by multi-face reflection mirror 8'. In FIG. 7A, the multi-face reflection mirror 8' is constituted by two mirrors 8a and 8b.

Figure 7B:
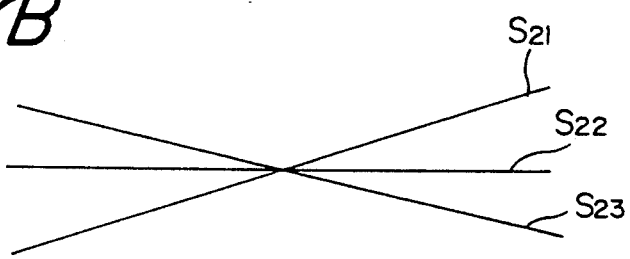

In FIG. 7B, the scanning patterns S21 to S23 are obtained by the V-shape polygonal mirror 6'. To obtain these three kinds of scanning patterns, it is necessary to provide three kinds of faces, each having different angles. In this embodiment, three sets of faces, each set having the same angles, are provided in the V-shape polygonal mirror 6'. Accordingly, the scanning patterns as shown in FIG. 7B are generated twice per one rotation of the V-shape polygonal mirror 6'.

Figure 7C:
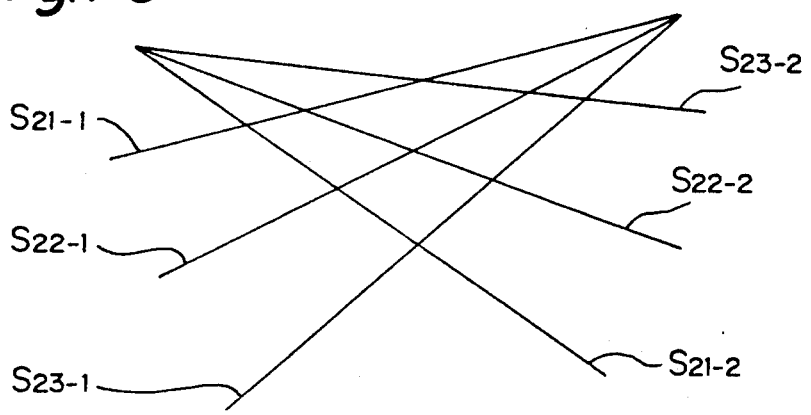

As shown in FIG. 7C, each scanning pattern S21 to S23 is divided into two scanning pattern S21-1 and S21-2, S22-1 and S22-2, and S23-1 and S23-2. As a result, the scanning patterns (six scanning patterns) as shown in FIG. 7B are generated twice per one of rotation of the V-shape polygonal mirror 6'.

Figure 8A:
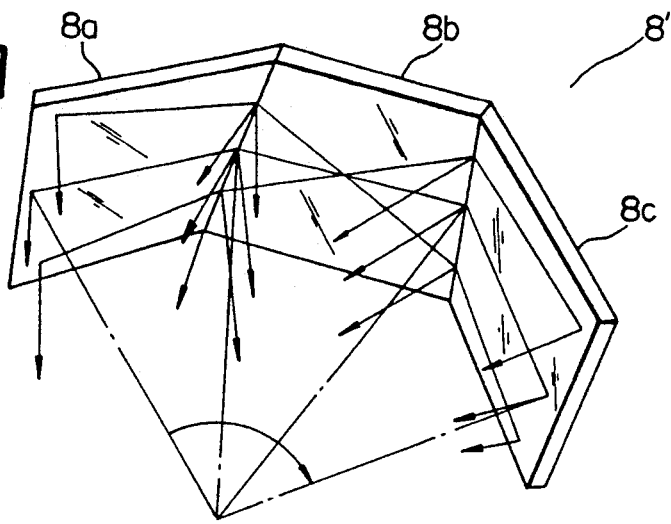
Figure 8B:
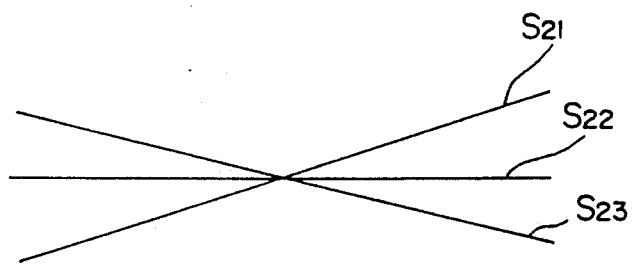
Figure 8C:
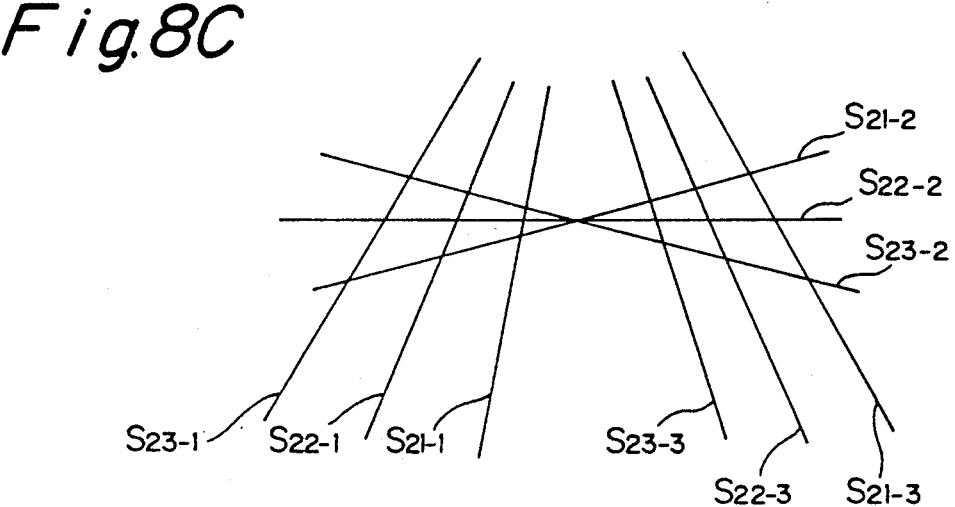

In FIG. 8A, the multi-face reflection mirror 8' is constituted by three mirrors 8a, 8b and 8c. The scanning patterns shown in FIG. 8B correspond to scanning patterns shown in FIG. 7B. As shown in FIG. 8C, nine scanning patterns S21-1 to S23-3 are obtained in the case of three reflection mirror 8a to 8c. In the above embodiments, although the V-shape polygonal mirror 6' has six faces, and the multi-face reflection mirror 8' has two or three mirrors, it is possible to provide the V-shape polygonal mirror 6', having more faces and the multi-face reflection mirror 8' having more reflection mirrors.

Figure 9:
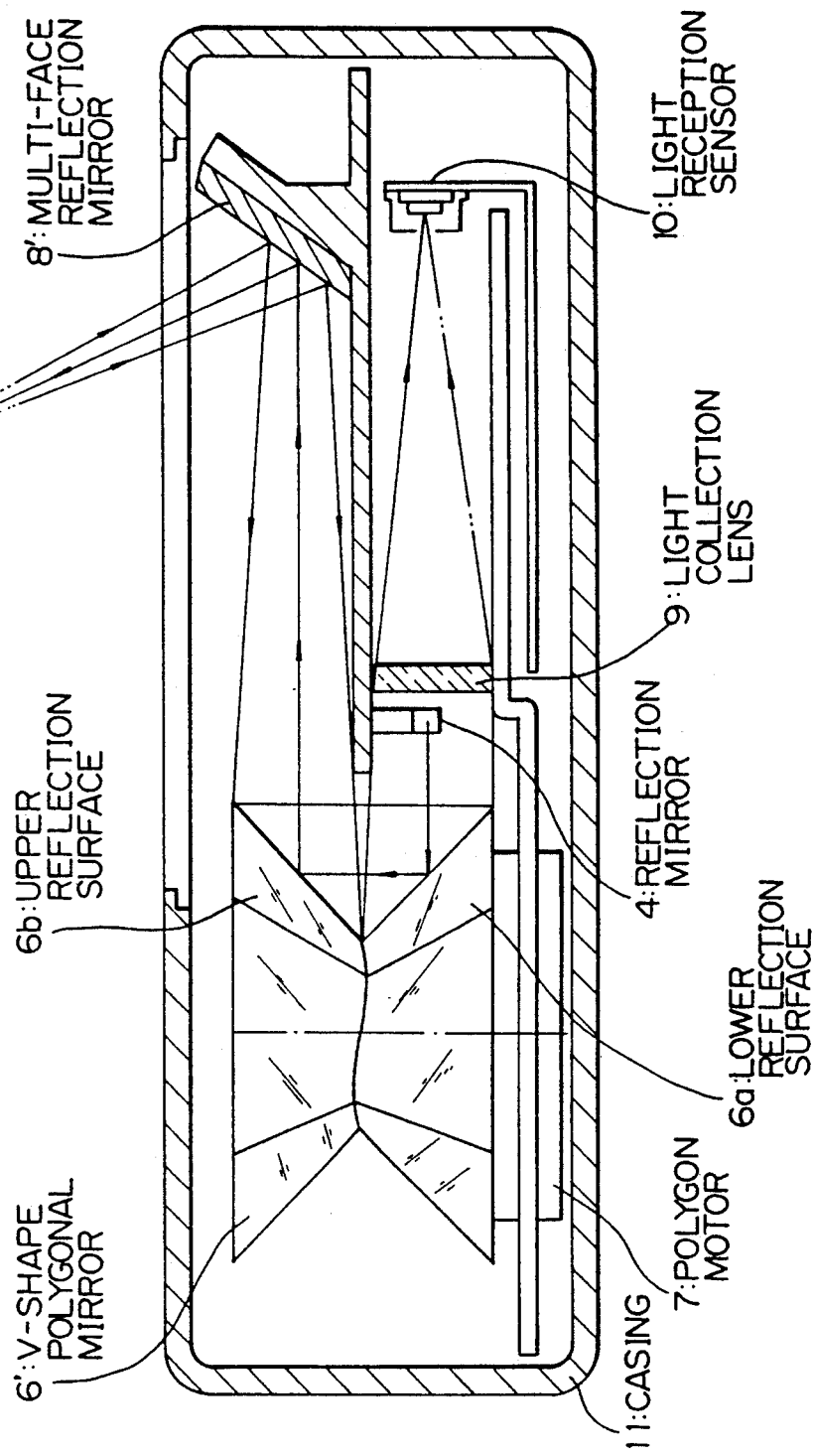
FIG. 9 is a schematic sectional view of a compact type bar code reader according to another embodiment of the present invention.
Figure 10:
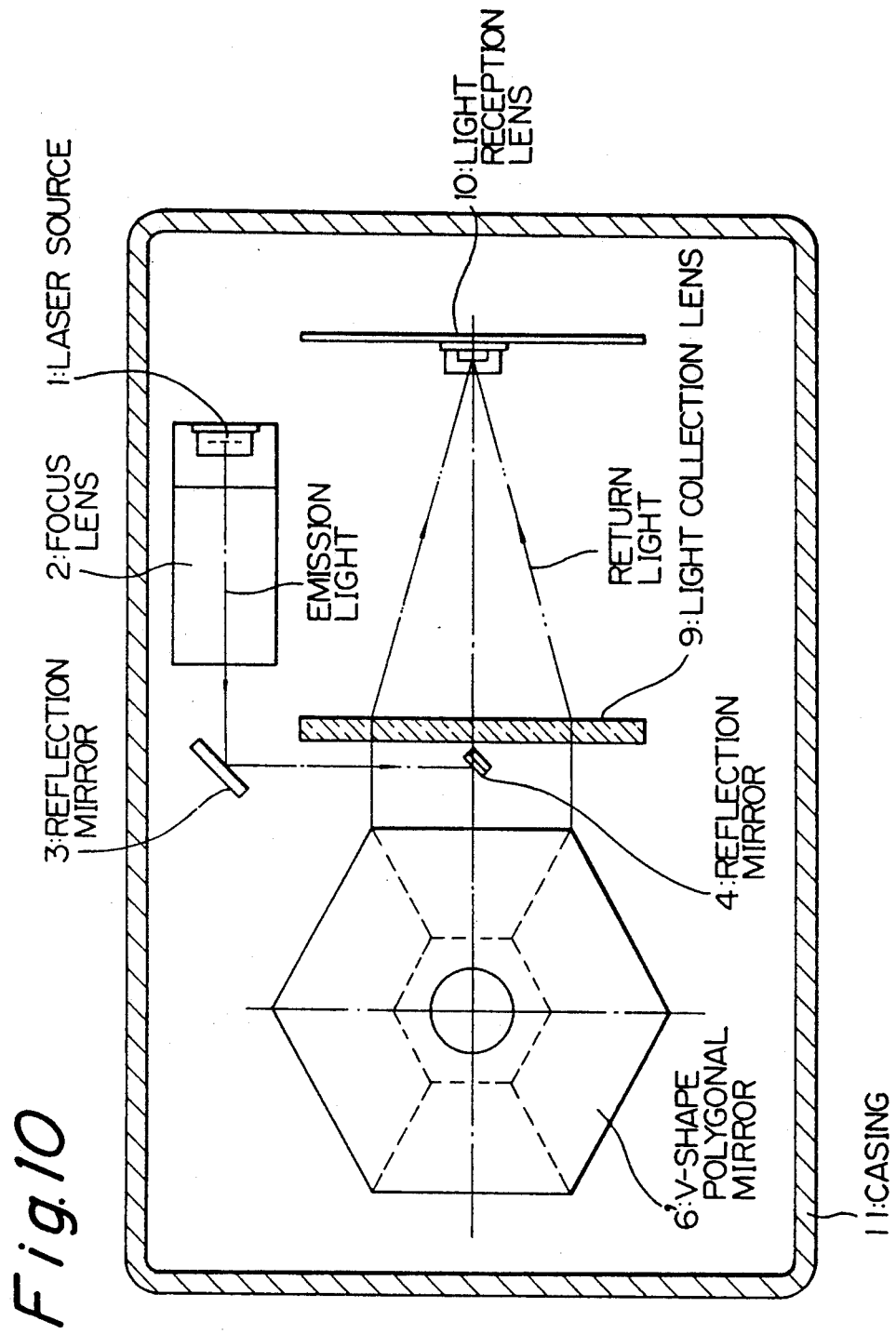
FIG. 10 is an upper view of the embodiment of FIG. 9.

FIG. 9 is a schematic sectional view of a bar code reader according to another embodiment of the present invention, and FIG. 10 is an upper view of FIG. 9. The structure of FIG. 9 shows the concrete structure of the bar code reader shown in FIG. 6. As is obvious from the drawings, the polygonal mirror 6 and the reflection mirror 5 shown in FIG. 3 are replaced by the V-shape polygonal mirror 6'. Further, the reflection mirror 8 shown in FIG. 3 is replaced by the multi-face polygonal mirror 8'. In this case, the reflection mirror 8 can also be used in this embodiment.

The laser beam from the laser source 1 is reflected by the reflection mirrors 3 and 4, reflected by the lower reflection surface 6a and the upper reflection surface 6b, of the V-shape polygonal mirror 6', further reflected by the multi-face reflection mirror 8', and then irradiated onto the bar code symbol. The laser beam reflected from the bar code symbol is reflected by the reflection mirror 8', reflected by the upper reflection mirror 6b, and the lower reflection 6a, collected by the light collection lens 9, and then received by the light reception sensor 10. Accordingly, the lower reflection mirror 6a is used for forming the light path between the upper portion and the lower portion.

Based on the above arrangement of each component, it is possible to ensure a long emitted light path and a short reflected light path. Further, it is possible to provide a small size light collection lens 9. Also, compactness of the compact type bar code reader of FIG. 9 is achieved by providing part of the emitted light path in common with (i.e., along the same path as) part of the reflected light path from the reflection mirror 4 to the bar code symbol via lower and upper reflection surfaces 6a and 6b of the V-shape polygonal mirror 6' and multi-face reflection mirror 8'. As a result, it is possible to produce a compact type bar code reader with a plurality of scanning patterns having various directions.

Figure 11:
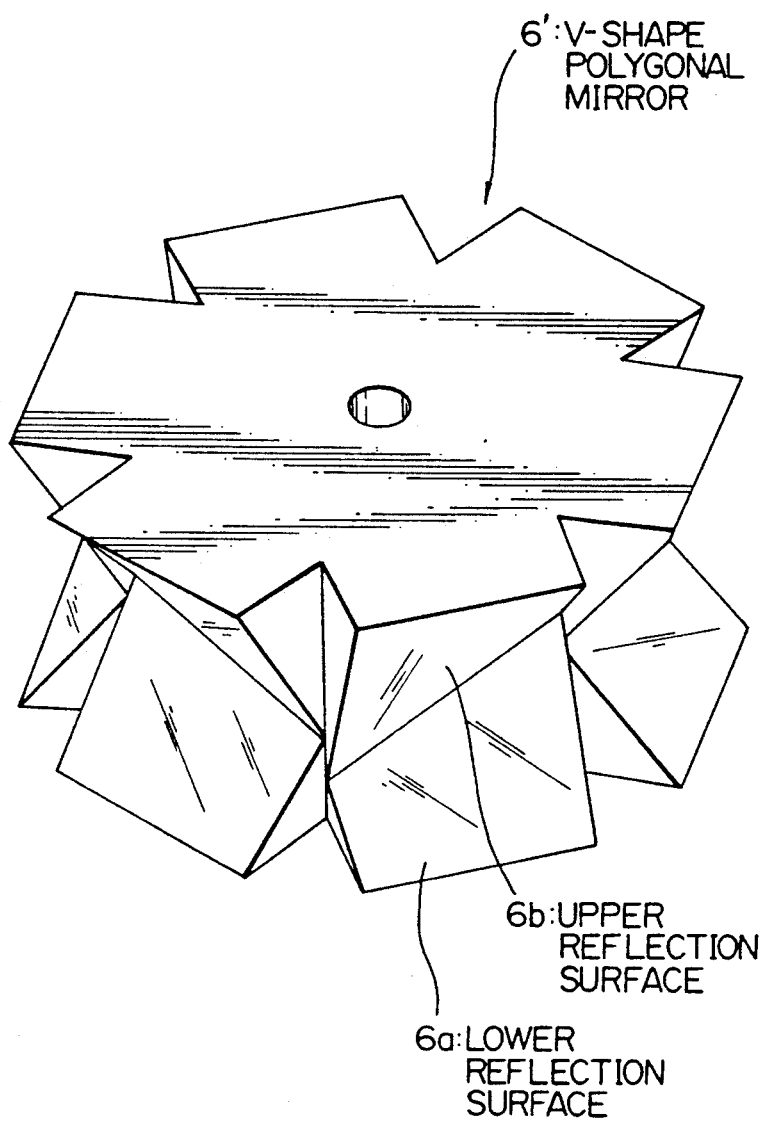
FIG. 11 is an enlarged perspective view of the V-shape polygonal mirror.

FIG. 11 is an enlarged perspective view of the V-shape polygonal mirror. As previously explained, reference number 6' denotes the V-shape polygonal mirror, 6a denotes the lower reflection surface, and 6b denotes the upper reflection surface.

Figure 12B:
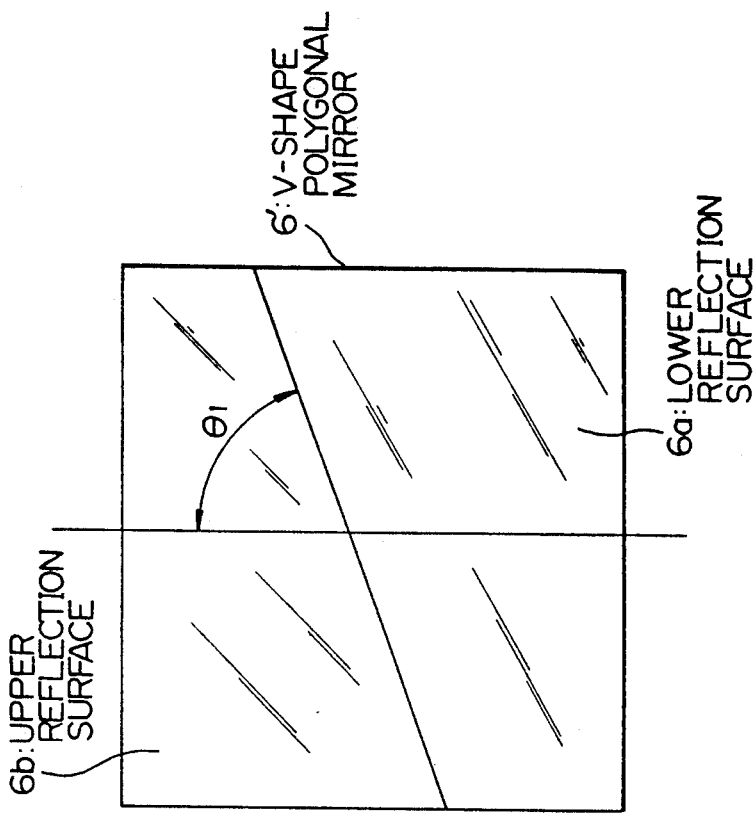
FIGS. 12A and 12B are views for explaining angles between the upper surface and the lower surface of the V-shape polygonal mirror.
Figure 12A:
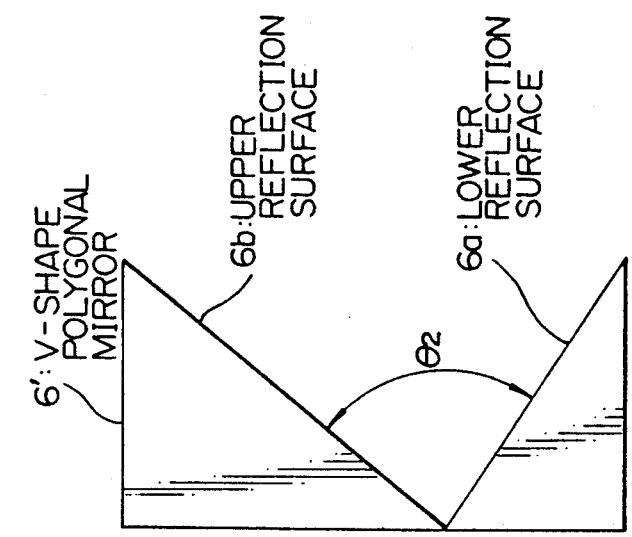

FIGS. 12A and 12B are views for explaining angles between the upper surface and the lower surface. In FIG. 12A, the intersection angle between the lower reflection surface 6a and the upper reflection surface 6b is shown by $\theta_2$. In FIG. 12B, the inclination angle between the lower reflection surface 6a and the upper reflection surface 6b is shown by $\theta_1$. The scanning pattern can be changed in accordance with the angles $\theta_1$ and $\theta_2$ as explained in detail below.

FIGS. 13A to 13C are views for explaining a change of scanning pattern based on the angles $\theta_1$ and $\theta_2$. In FIG. 13A, when the intersection angle $\theta_2$ is changed, the position of the scanning pattern is shifted in parallel as shown by S11 to S14. In FIG. 13B, when the inclination angle $\theta_1$ is changed, the inclination (direction) of the scanning pattern is changed around the center P as shown by S21 to S27. The scanning patterns S31 to S34 shown FIG. 13C are in the case of the change of both of the angles $\theta_1$ and $\theta_2$. As shown in FIG. 13C, many kinds of the scanning patterns having various directions can be obtained based on the change of the angles $\theta_1$ and $\theta_2$.

Accordingly, in the V-shape polygonal mirror 6' shown in FIG. 11, it is possible to provide six kinds of intersection angles and six kinds of inclination angles so that many kinds of scanning patterns can be obtained even in a compact bar code reader.

Figure 14:
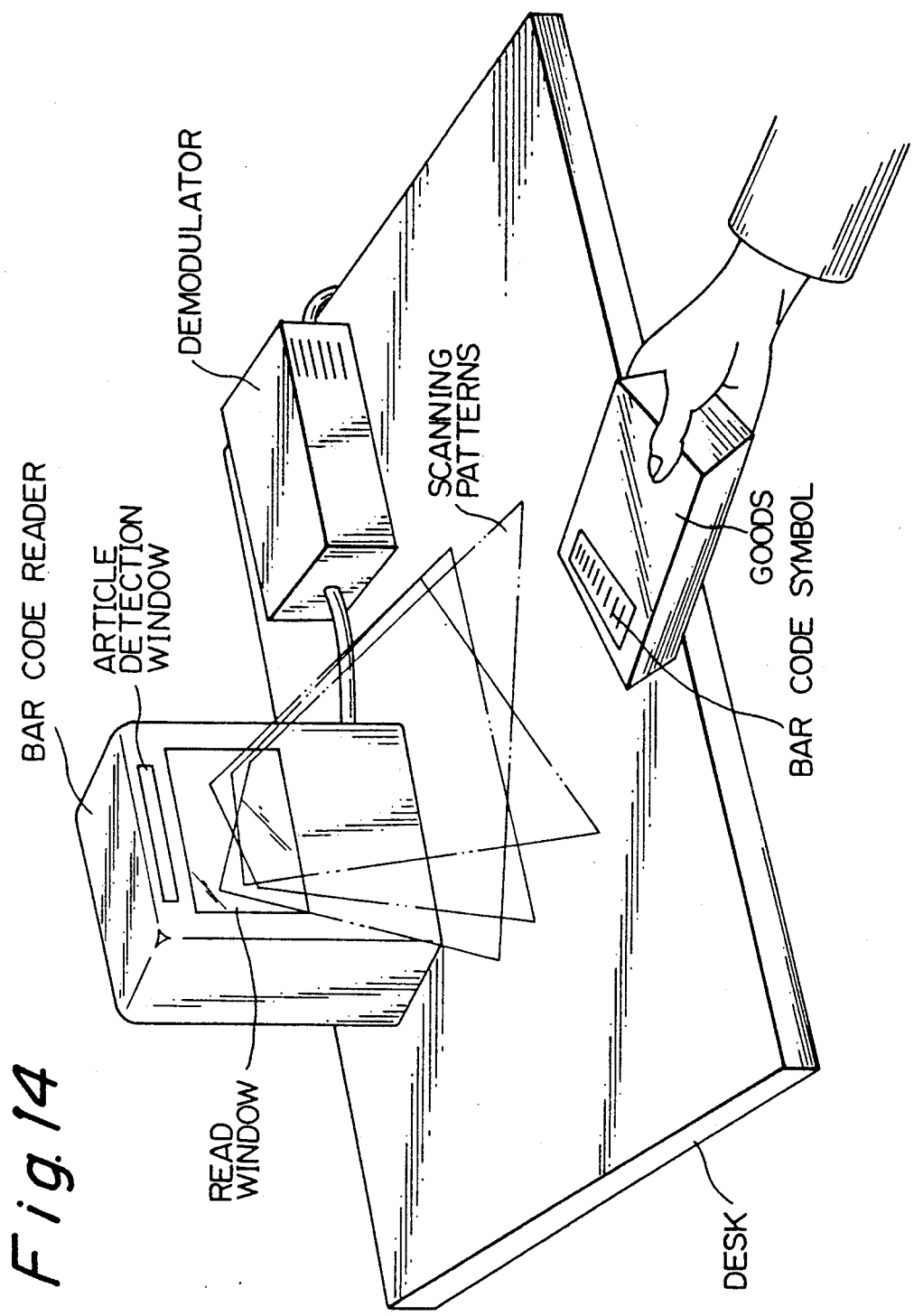
FIG. 14 is a schematic outer view of a compact type bar code reader according to the present invention.

FIG. 14 is a schematic outer view of a compact bar code reader according to the present invention. Since the bar code reader according to the present invention is very small, it can very easily be put on a desk or counter in a small store. As seen in FIG. 14, a demodulator is also connected to the bar code reader and when the bar code symbol on goods is exposed by hand to the scanning patterns, the bar code is easily detected since many kinds of the scanning patterns are generated from the read window.

Regarding an article detection window in the bar code reader, an explanation is given in detail hereinafter.

Figure 15:
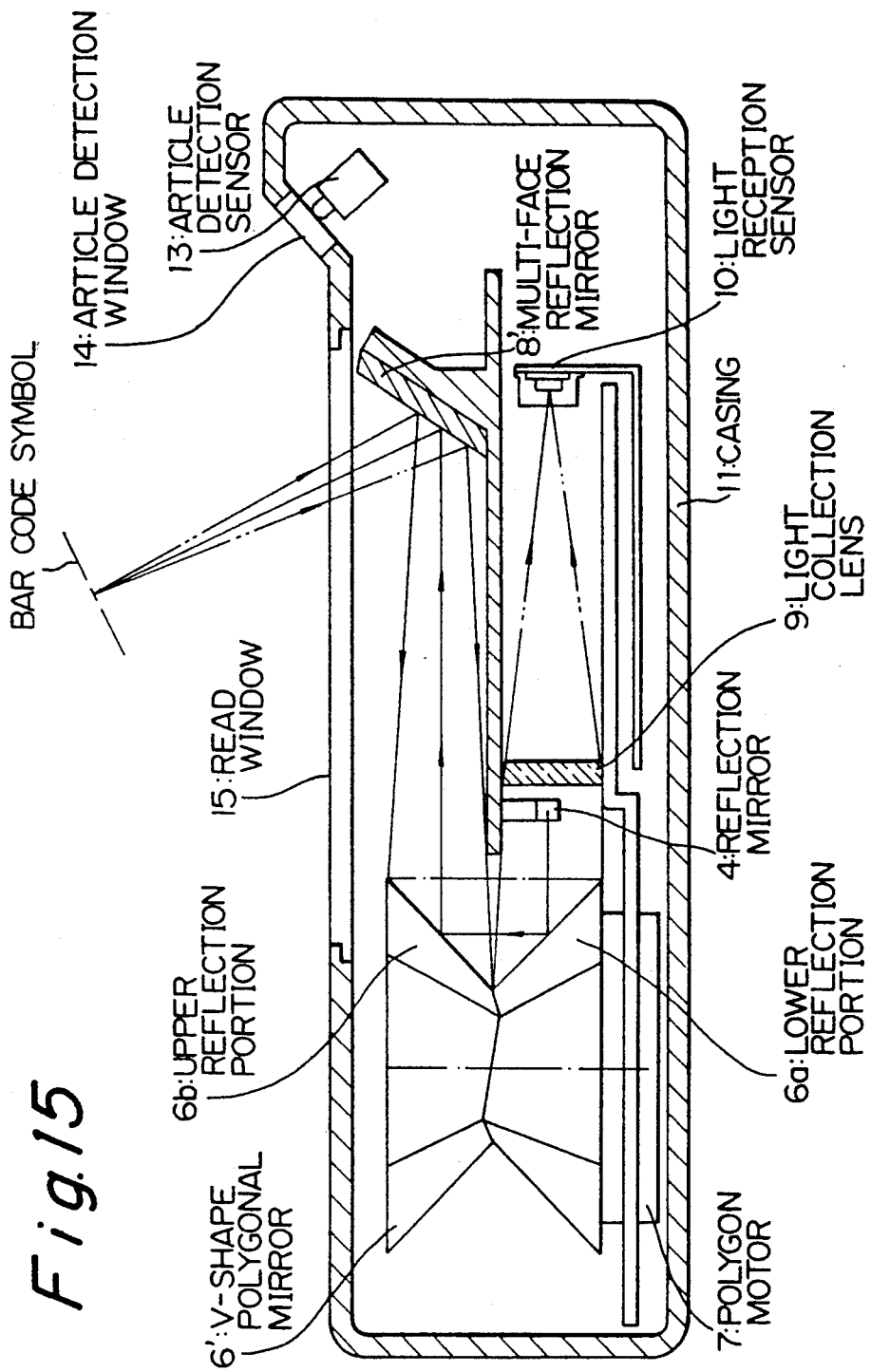
FIG. 15 is a schematic sectional view of a compact type bar code reader according to still another embodiment of the present invention.

FIG. 15 is a schematic sectional view of a compact type bar code reader according to still another embodiment of the present invention. In FIG. 15, 13 denotes an article detection sensor for detecting the article (goods), 14 denotes the article detection window for the light path, and reference number 15 denotes the read window for the light path of the laser beam. Other components are the same as those of FIG. 9. In this embodiment, the article detection sensor 13 is provided to quickly and exactly detect the position of the goods before the bar code symbol is detected as explained below. It is thus possible to extend the life of the laser source since the irradiation of the laser beam is started after the article detection sensor 13 detects the goods.

Figure 16A:
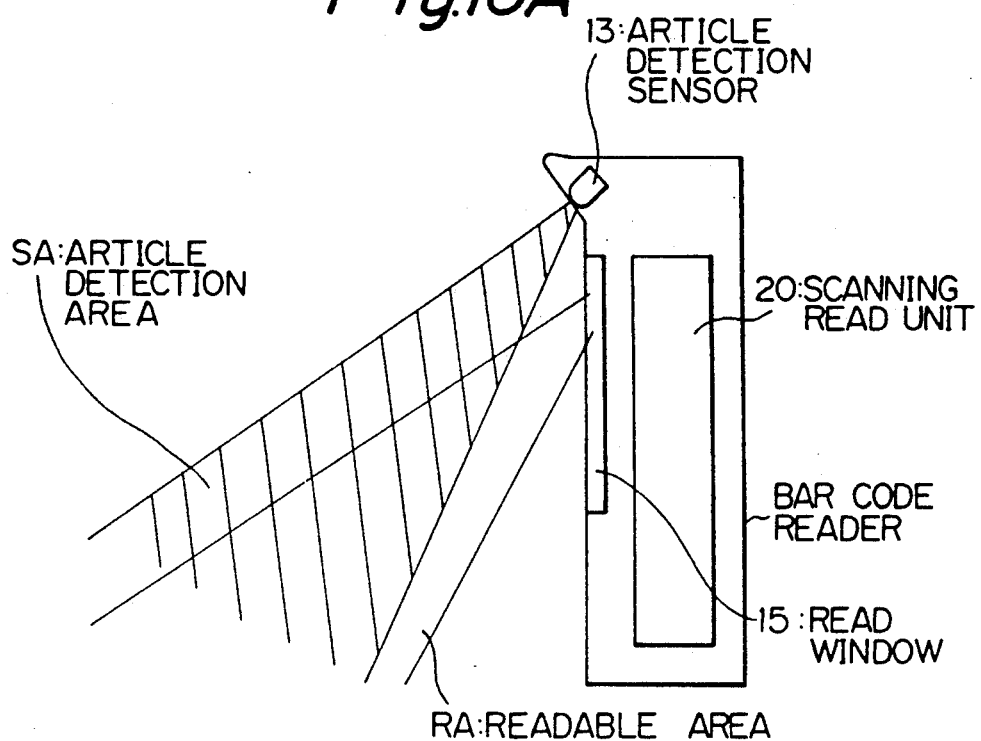
FIGS. 16A to 16C are views for explaining an article detection method shown in FIG. 15.
Figure 16B:
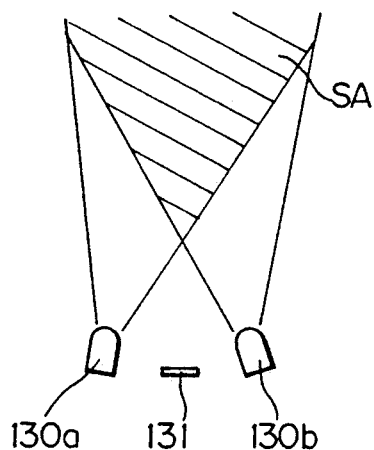
Figure 16C:
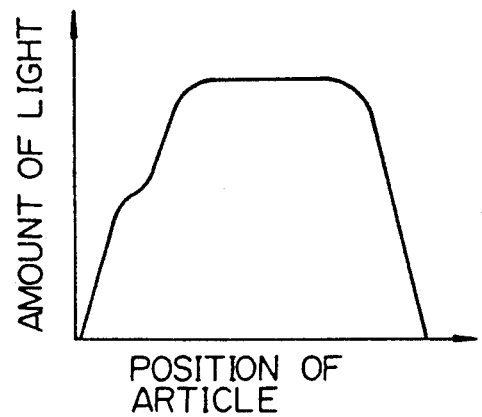

FIGS. 16A to 16C are views for explaining the article detection method shown in FIG. 15. In FIG. 16, SA denotes an article detection area (slant lines), and RA denotes a bar code symbol readable area. As shown in the drawing, the article detection area SA and the bar code symbol readable area RA are directed downward toward the bottom, and are provided so as to almost completely overlap. In this case, at least the article detection area SA is directed downwardly so as not to detect an operator.

In FIG. 16B, 130a and 130b denote light emission elements (for example, an LED), and 131 denotes a light reception element. The article detection area SA is formed by the slanted area overlapped by light emission from both LEDs 130a and 130b. In FIG. 16C, the ordinate shows amount of light, and the abscissa shows the position of the article. It is possible to obtain a constant amount of light regardless of the position of the article since two light emissions overlap.

Figure 17A:
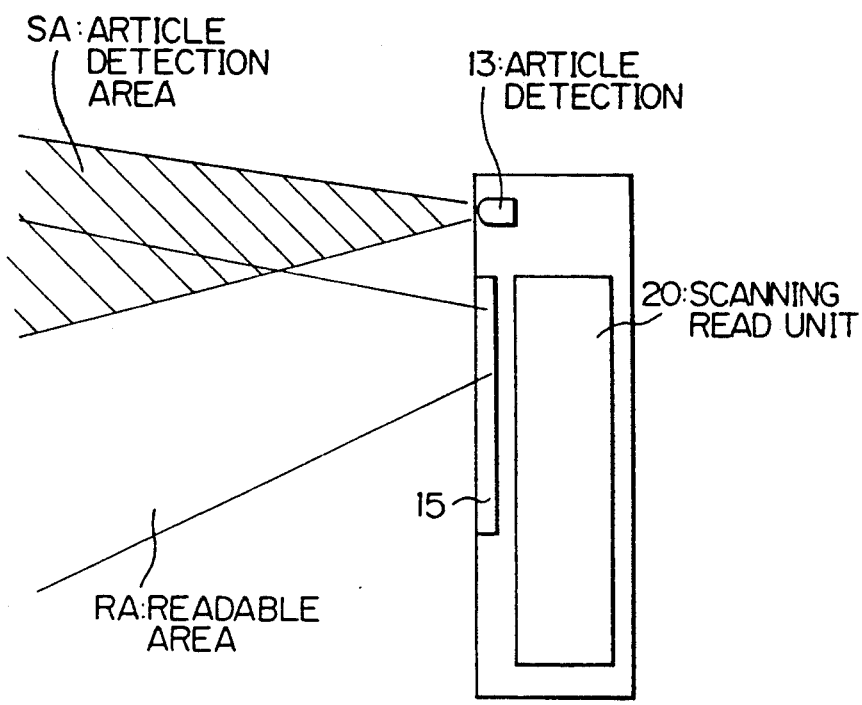
FIGS. 17A to 17C are views for explaining a conventional article detection method.
Figure 17B:
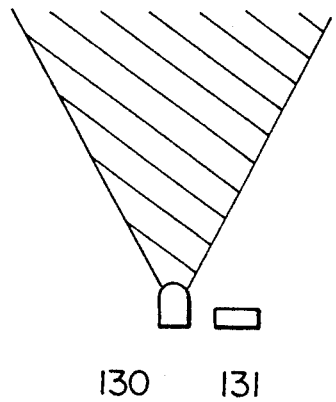
Figure 17C:
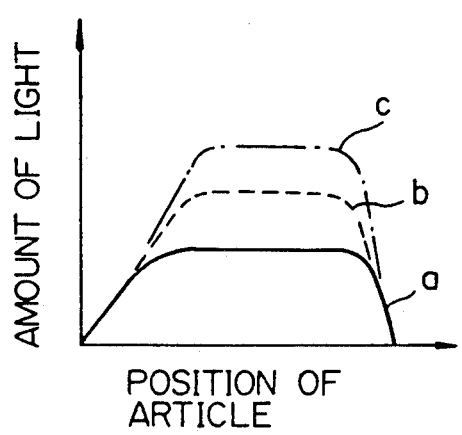

FIGS. 17A to 17C are views for explaining a conventional article detection method. In FIG. 17A, the article detection area SA and the bar code symbol readable area RA are not always directed so as to overlap in the conventional art. In FIG. 17B, only one light emission element 130 is provided in the conventional art. Accordingly, as shown by curves a, b, and c in FIG. 17C, various amounts of light appear due to the dispersion of the light output characteristics of each element.

FIG. 18 is a schematic elevation view of the bar code reader shown in FIG. 15. In the article detection window, two light emission elements 130a and 130b, and a light reception element 131 are provided as shown in FIG. 16B.

FIG. 19 is a detailed view of the article detection area and the bar code symbol readable area. The article detection sensor 13 and the reflection mirror 8' are directed toward the desk or counter so that it is possible to avoid an error in reading the bar code when the operator is seated in front of the bar code reader.

FIG. 20 is a view for explaining another example of the bar code symbol readable area shown in FIG. 19. As is obvious from the drawing, the bar code symbol readable area RA is directed in a horizontal direction. In this case, the article detection area SA is directed toward the desk or counter.

Figure 21:
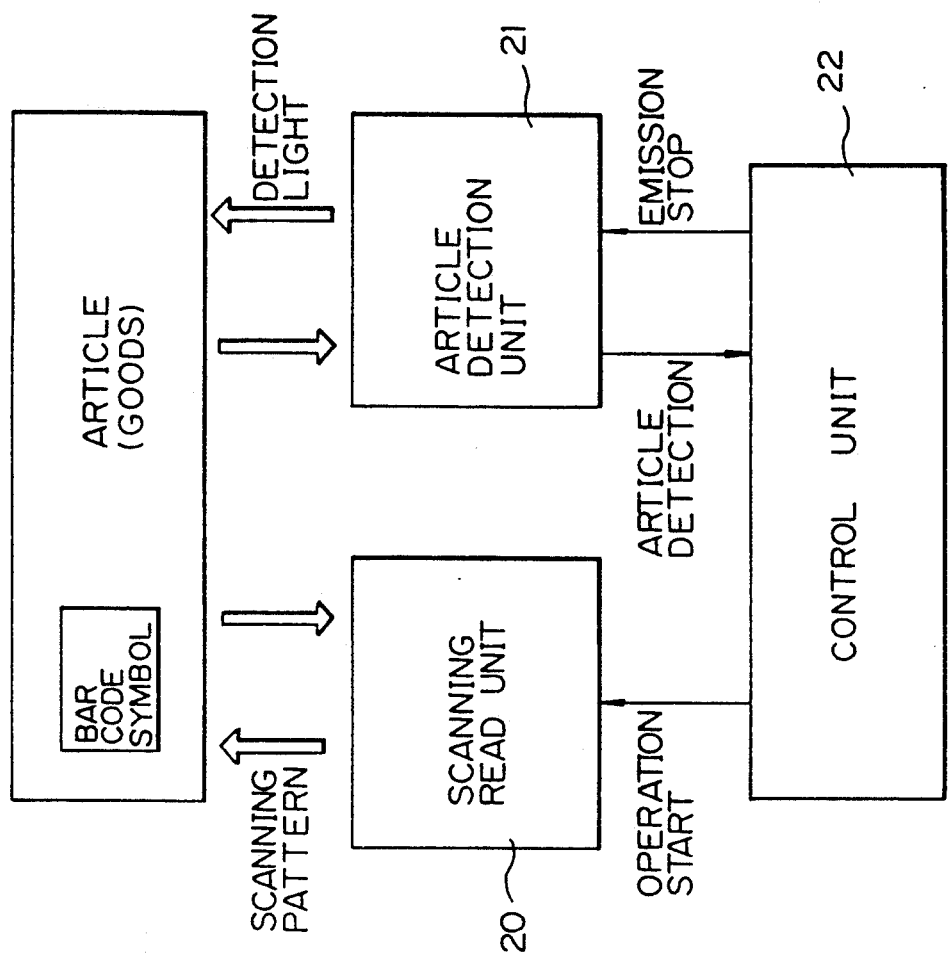
FIG. 21 is a basic block diagram of the compact type bar code reader shown in FIG. 21.

FIG. 21 is a basic block diagram of the bard code reader shown in FIG. 21. In FIG. 21, reference number 20 denotes a scanning read unit for reading the bar code symbol, 21 an article detection unit for detecting the article, and 22 denotes a control unit for controlling the operation of the units 20 and 21. That is, the control unit 22 controls the start of the scanning operation of the unit 20 in response to the detection signal of the article by means of the article detection unit 21, and controls the stop of the detection light from the article detection unit 21 after the read operation of the bar code is started.

Accordingly, it is possible to increase the precision of the detection of the bar code since the detection light from the article detection unit 21 is stopped during the read operation. Further, it is possible to extend the life of the laser source since the laser beam is turned on only after the article is detected.

Figure 22:
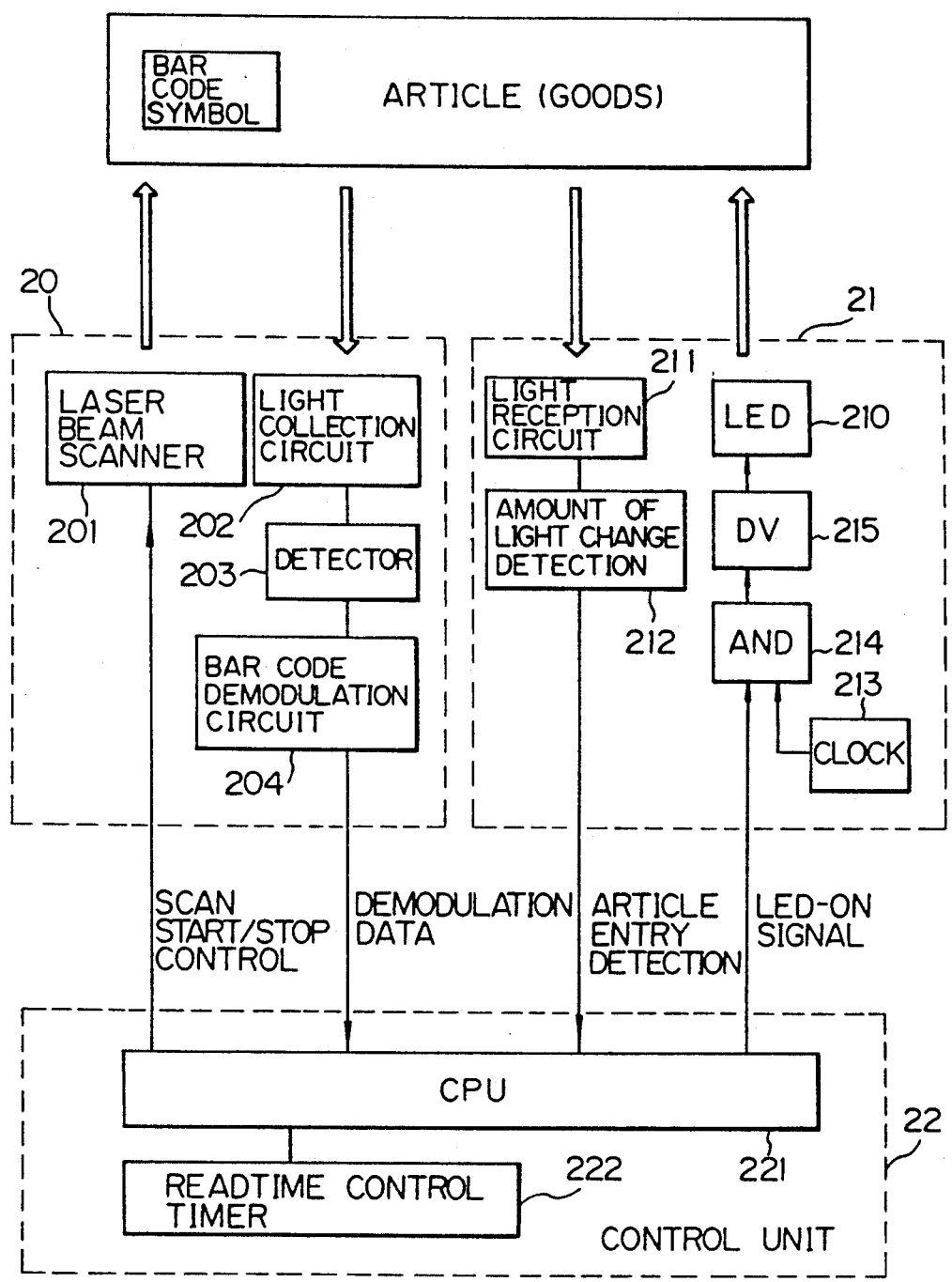
FIG. 22 is a detailed block diagram of the compact type bar code reader shown in FIG. 21.

FIG. 22 is a detailed block diagram of the bar code reader shown in FIG. 21. The scanning read unit 20 is constituted by a laser beam scanner circuit 201, a light collection circuit 202, a detector 203, and a bar code demodulation circuit 204. The article detection unit 21 is constituted by a light emitting element (LED) 210, a light reception circuit 211, an amount of light change detection circuit 212, a clock generation circuit 213, an AND gate 214, and a drive circuit (DV) 215. Further, the control unit 22 is constituted by a central processing unit (CPU) 221 and a read time control timer 222.

Figure 23:
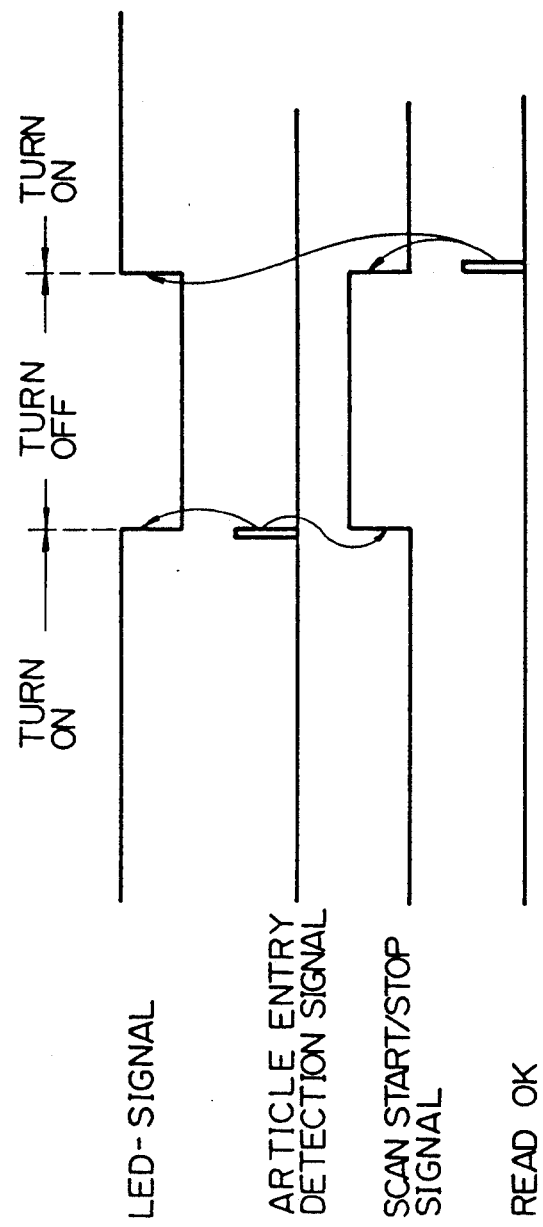
FIG. 23 is a signal timing chart of the circuit shown in FIG. 22.
Figure 24:
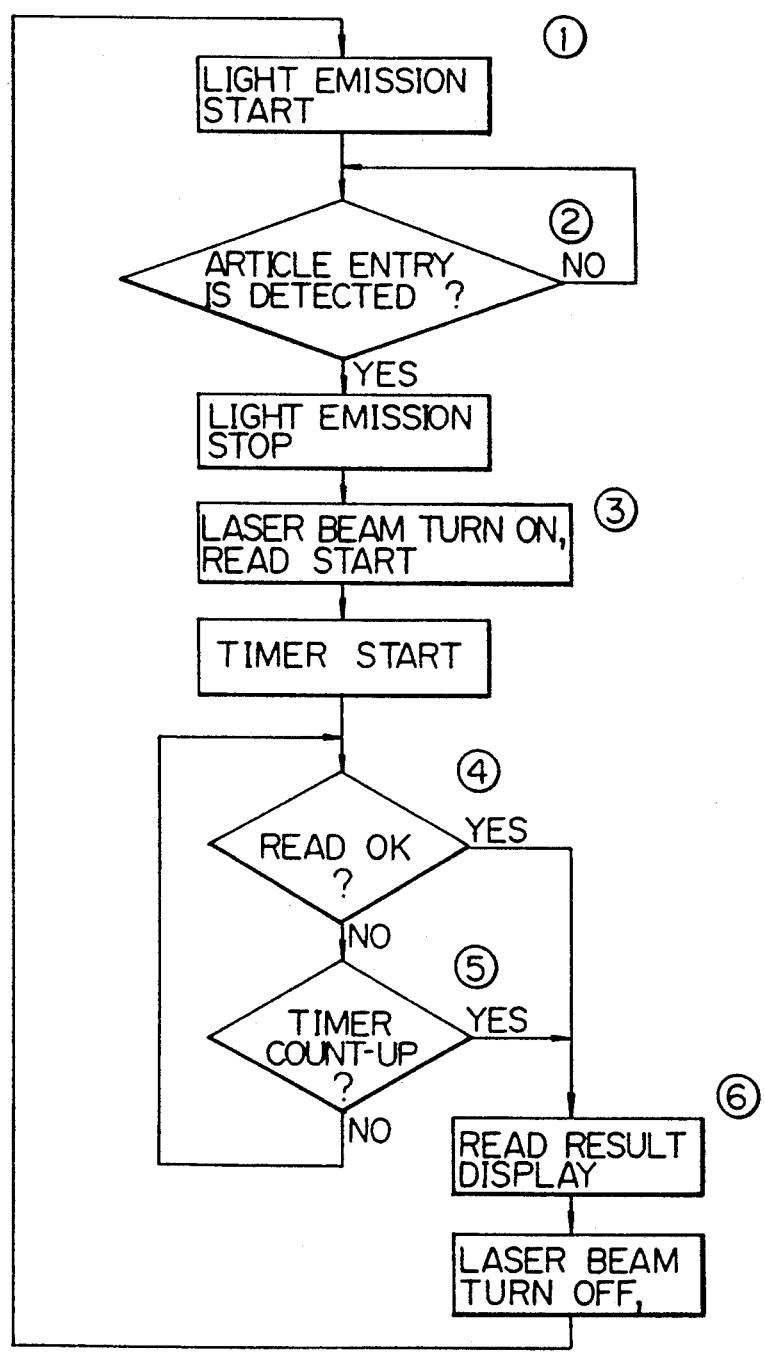
FIG. 24 is a flowchart of the circuit

FIG. 23 is a signal timing chart of the circuit shown in FIG. 22, and FIG. 24 is a flowchart of the circuit 22.

As shown in FIG. 23, briefly, the control unit 22 generates the LED-ON signal to be sent to the article detection unit 21. When the article entry detection signal is returned from the article detection unit 21 to the control unit 22, the scan start signal is generated from the control unit 22 to the scanning read unit 20 and the demodulation data is returned from the scanning read unit 20 to the control unit 22. The LED is turned off during the operation of reading the bar code. Further, when the read operation is completed, the scan stop signal is generated from the control unit 23 and sent to the scanning read unit 20 and the LED is again turned on.

The above operation is explained in detail with reference to FIG. 24. When the CPU generates the LED-ON signal and sends it to the article detection unit 21, the AND gate 214 is opened by the LED-ON signal and the clock pulse from the clock circuit 213 is transferred to the LED 215 through the drive circuit 215. As a result, a pulsed detection light is emitted from the LED 210. The pulsed turning-ON of the LED is effective to extend the life of the LED and to reduce the power consumption of the bar code reader. The detection circuit 212 detects the change of the amount of the light from the bar code symbol. That is, when the article enters in the detection area SA, the detection light changes in response to the change of the reflection light from the article. Accordingly, the CPU 221 detects the change of the detection light so that the turning-ON of the LED is stopped. Next, the CPU 221 sends a scan start signal to the laser scanner 201, and the laser beam is irradiated onto the bar code symbol. At the same time, the control timer 222 is started to count the irradiation time. This time is determined based on the experience of the handling speed (entry speed) of the article. The reflected laser beam is collected by the circuit 202, received by the detector 203, and demodulated by the bar code demodulation circuit 204. When the CPU 221 receives the demodulation data from the bar code demodulation circuit 204, the CPU confirms completion of the read of the bar code symbol (READ-OK). If the reading of the bar code is not completed, the CPU 221 checks the count value of the timer 222. If the count of the timer is not completed, the process is returned to the step . When the reading of the bar code is completed, the green lamp is turned on, and the laser beam is turned off, then the LED is turned back on to detect a next article.

With this embodiment, it is possible to precisely detect the bar code symbol since the LED is turned off when the laser beam is irradiated onto the bar code symbol. This is because the reading of the bar code symbol is not disturbed by the irradiation of the LED.

The following explanations are given regarding the manufacturing process of the V-shape polygonal mirror according to the present invention.

Figure 25A:
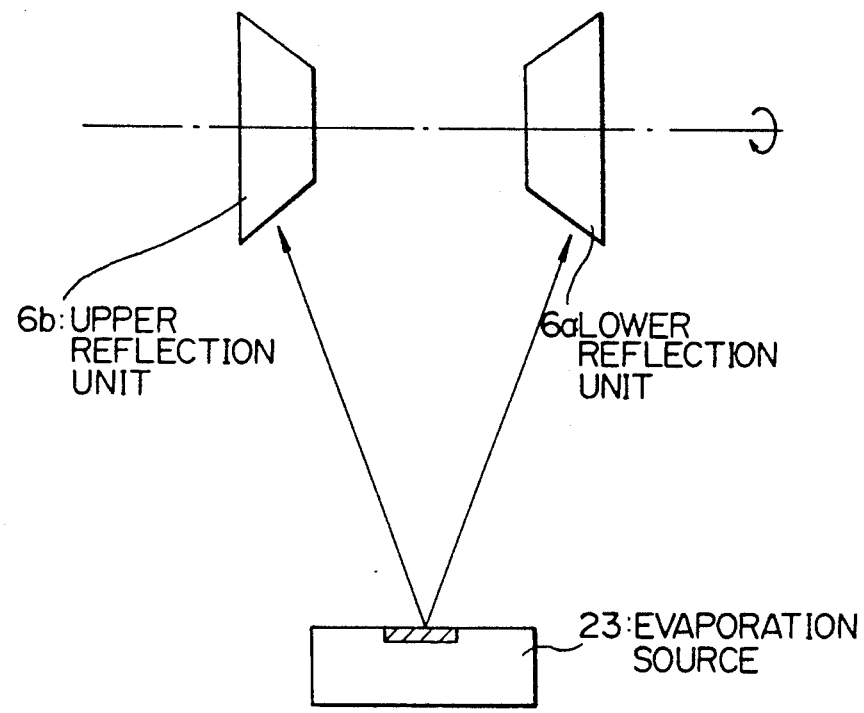
FIGS. 25A and 25B are views for explaining the manufacturing process of the V-shape polygonal mirror according to an embodiment of the present invention.
Figure 25B:
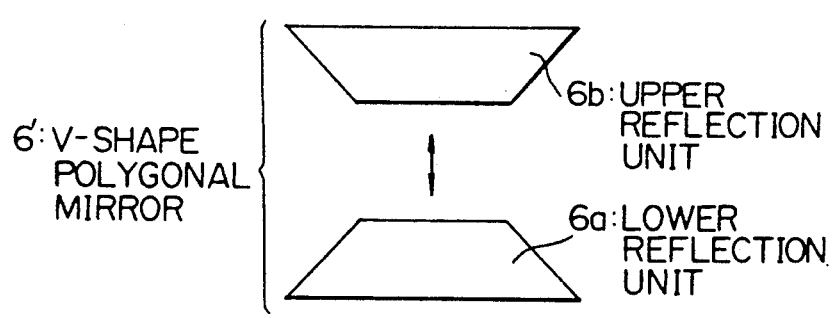

FIGS. 25A and 25B are views for explaining the manufacturing process of the V-shape polygonal mirror according to an embodiment of the present invention. As shown in FIG. 25A, in the manufacturing process, the V-shape polygonal mirror is divided into the lower reflection unit 6a and the upper reflection unit 6b, then, each surface is coated with a metal film evaporated from an evaporation source 23. Since each surface is separately coated by the evaporated metal film, it is possible to form a metal film having a uniform thickness over all surfaces. As shown in FIG. 25B, after coating, the lower reflection un 6a and the upper reflection unit 6b are coupled with each other to form the V-shape polygonal mirror 6'.

In the conventional manufacturing process, the V-shape polygonal mirror is not divided into the upper and the lower unit, but is integrally subjected to coating by the evaporated metal film from the evaporation source. Accordingly, it is difficult to ensure uniformity of the thickness of the metal film on the surface. This is because the intersection angle between the upper unit and the lower unit is sharp so that the metal film becomes thin in the corner portion.

Figure 26A:
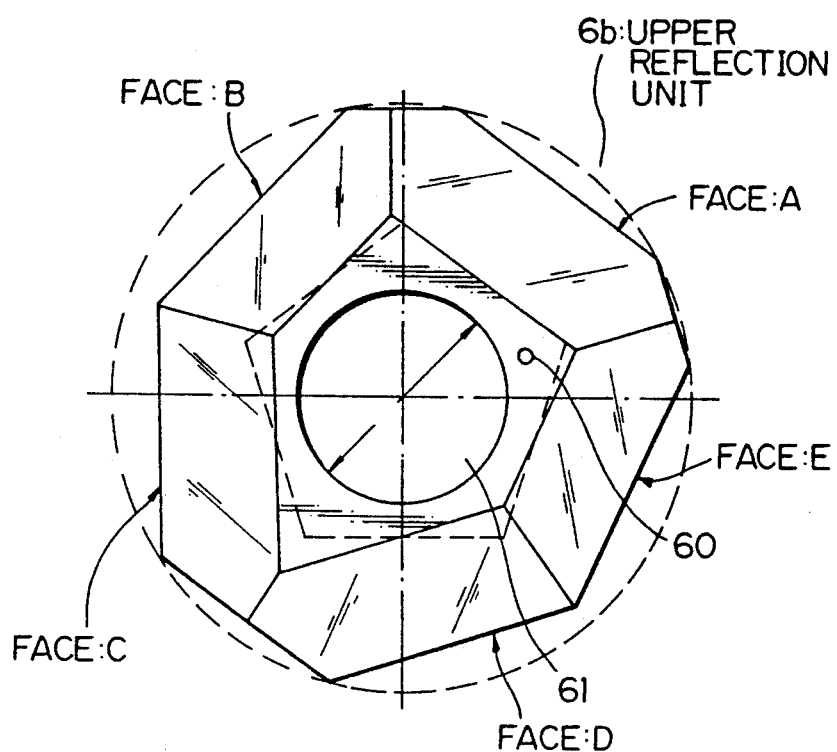
FIGS. 26A and 26B show the upper reflection unit.
Figure 26B:
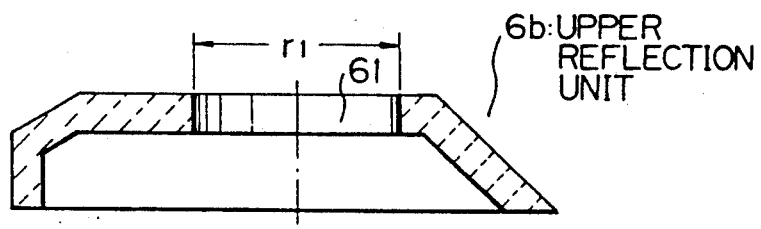
Figure 27A:
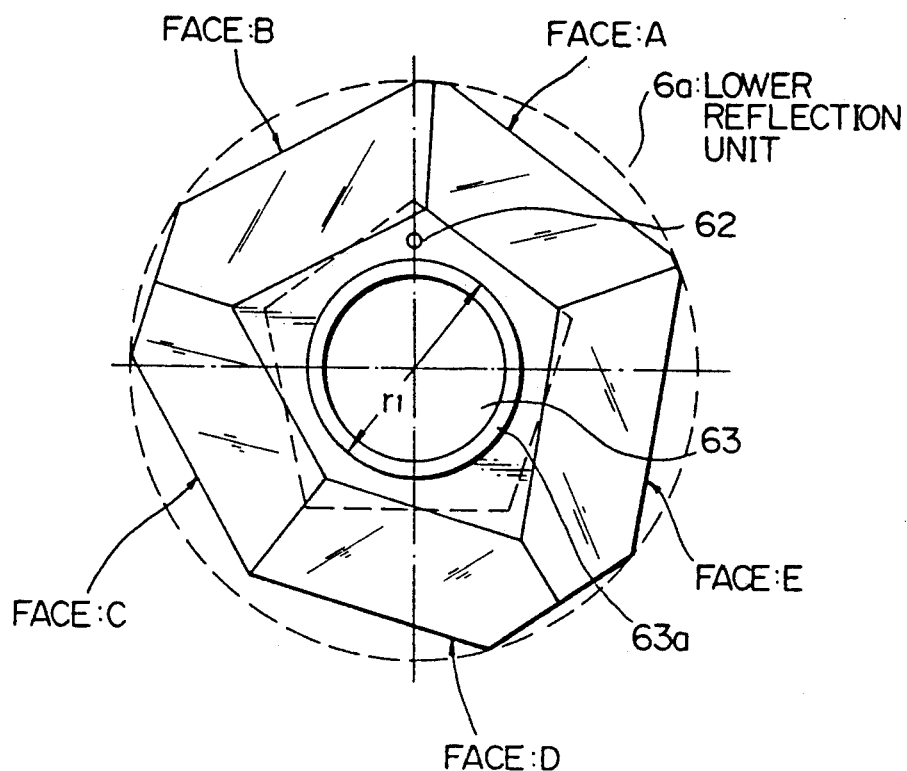
FIGS. 27A and 27B show the lower reflection unit.
Figure 27B:
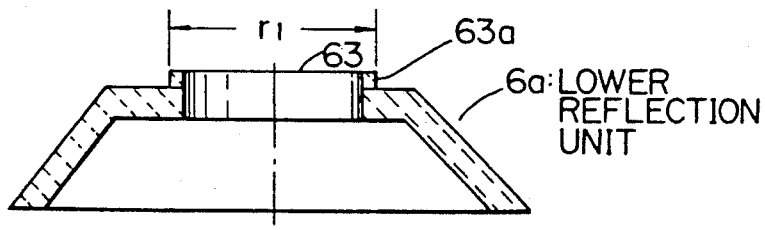
Figure 28B:
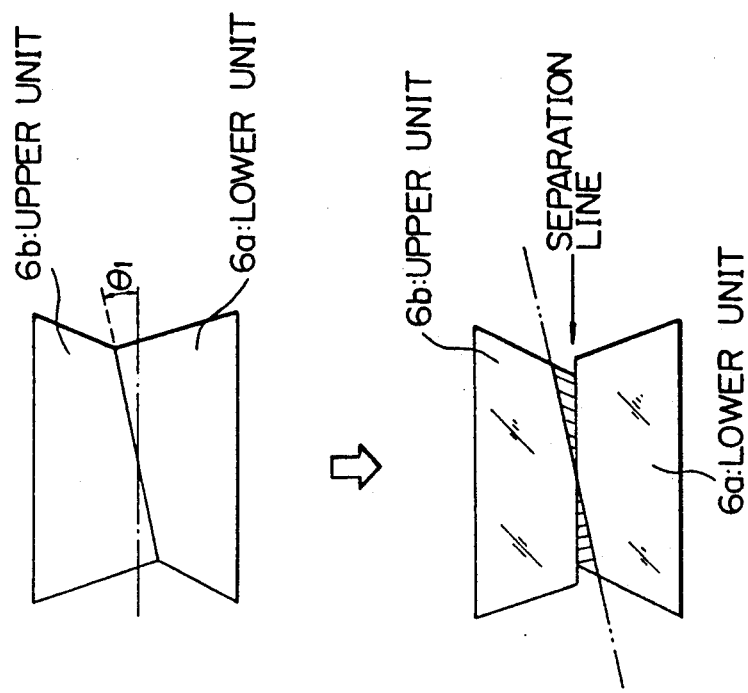
FIGS. 28A and 28B are views for explaining the method of division between the upper unit and the lower unit.
Figure 28A:
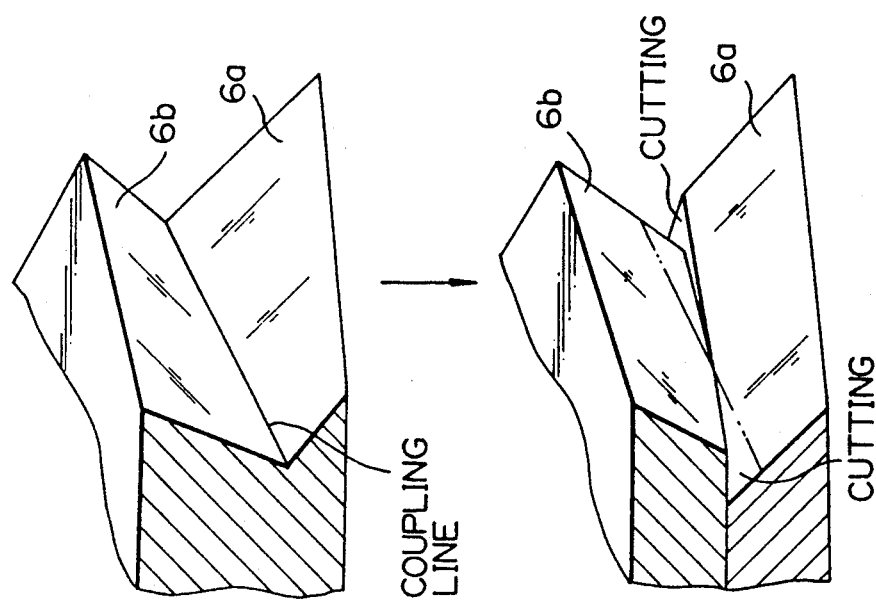

FIGS. 26A and 26B show the upper reflection unit, FIGS. 27A and 27B show the lower reflection unit, and FIGS. 28A and 28B are views for explaining the division method between the upper unit and the lower unit.

Each of the upper and lower reflection units is made using a plastic mold. In FIGS. 26A and 26B, 60 denotes a coupling pin to position the upper unit and the lower unit, and 61 denotes a coupling hole having a diameter $r_1$ to couple the upper unit and the lower unit. Accordingly, the coupling hole 61 is coupled to the projection 63a in FIGS. 27A and 27B in the final process of the manufacture.

As shown in FIG. 28B, the upper unit 6b and the lower unit 6a are divided along the horizontal separation line to facilitate the plastic mold of the upper and the lower units. After molding, the coupling portions of the upper and the lower units are cut as shown in FIG. 28A to form the coupling line having the inclination angle $\theta_1$.

FIG. 29 is a view for explaining the evaporation process. A plurality of the upper and lower units 6a and 6b are provided on support axle 24. In the evaporation process, the support axle 24 is gradually rotated so that the metal film can be uniformly coated on the surface. Further, as is obvious from the drawing, since the corner portion based on the intersection angle does not exist in each unit, it is possible to ensure a uniform thickness.

FIG. 30 is a sectional view after assembly the V-shape polygonal mirror and the polygon motor. In FIG. 30, reference number 7 denotes the polygon motor, 7a denotes a rotor, 7b denotes a stator, 70 denotes a rotation axle, and 71 denotes a bearing. Further, 64 denotes a rubber spacer, 65 denotes a flat spring, and 66 denotes a screw.

First, the rotation axle 70 is inserted into the stator 7b through the bearing 71. Second, the 7a is mounted onto the rotation axle 70 by the screw 66. Third, the lower reflection unit 6a is mounted on to the stator 7a. Fourth, the upper reflection unit 6b is mounted onto the lower reflection unit 6a through the hole 61 and the projection 63a. Finally, the flat spring 65 is mounted to the rotation axis 70 by the screw 66. At the same time, the rubber spacer 64 is provided between the upper reflection unit 6b and the flat spring 65.

Figure 31:
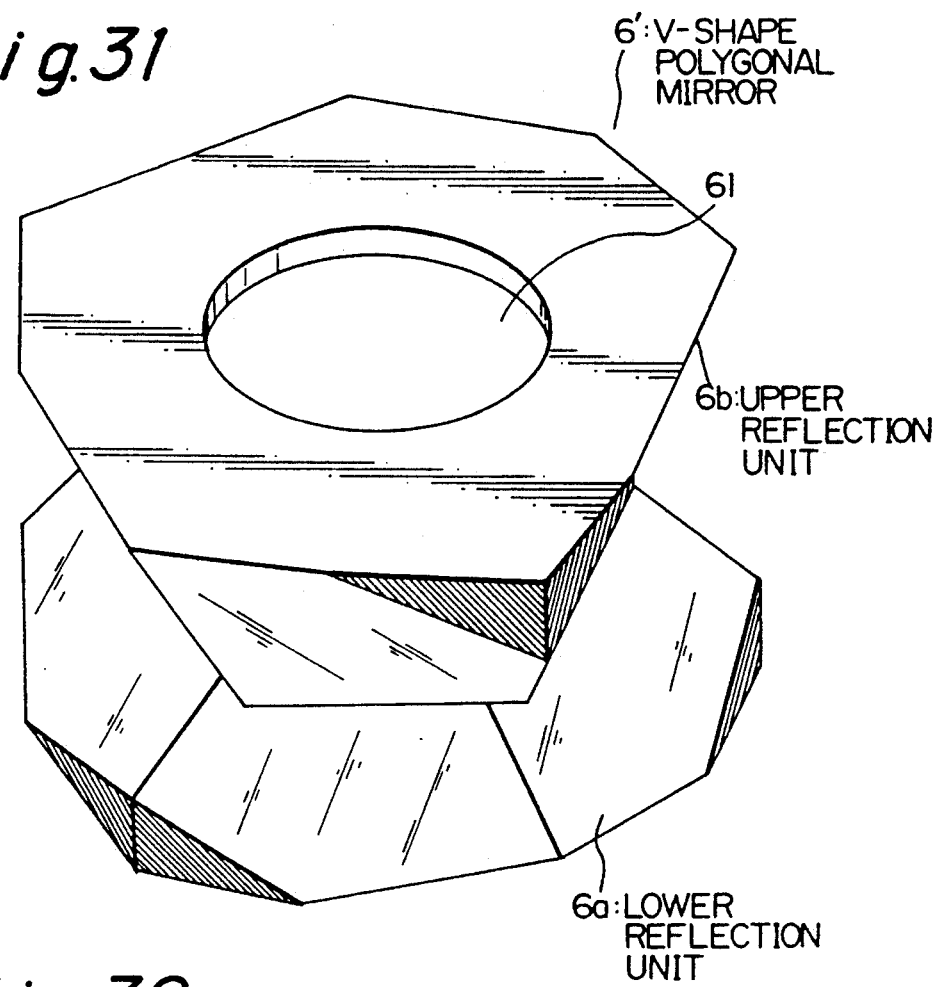
FIG. 31 is a schematic perspective view of the V-shape polygonal mirror.

FIG. 31 is a schematic perspective view of the V-shape polygonal mirror after assembly. As is obvious from the drawing, the outer configuration is deformed based on requirements of the manufacturing process, but has no influence on the scanning patterns of the laser beam.

Figure 32:
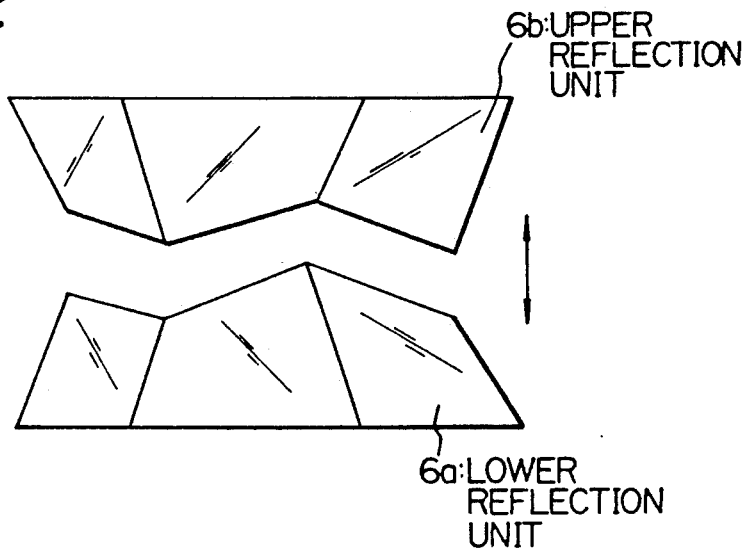
FIG. 32 is a view for explaining another example of a division method.

FIG. 32 is a view for explaining another example of a division method. In this example, the separation line between the upper reflection unit 6b and the lower reflection unit 6a is provided along the inclination angle $\theta_1$. Accordingly, it is possible to ensure a large reflection area in the surfaces of the upper and lower reflection units 6b and 6.

We claim:

1. A compact type bar code reader for detecting a bar code symbol provided on a surface of an article, comprising:
    laser beam generating means for generating a laser beam to be irradiated onto a bar code symbol;
    focus means for determining a focus of the laser beam;
    scanning pattern forming means for forming a plurality of scanning patterns of the laser beam;
    light reflection means for reflecting the laser beam to and from the bar code symbol;
    light collection means for collecting the laser beam reflected from the bar code symbol;
    light reception means for receiving the laser beam collected by the light collection means, and for converting the laser beam collected by the light collection means into an electric signal; and
    a casing for housing the laser beam generation means, the focus means, the light collection means, and the light reception means which are arranged at a lower portion of the casing, and for housing the scanning pattern forming means and light reflection means which are arranged at an upper portion of the casing so that a light path of the laser beam is formed in such a way that an emitted light path from the laser beam generation means to the bar code symbol becomes greater than a predetermined value sufficient to ensure accurate detection of the bar code symbol, a reflected light path from the bar code symbol to the light reception means is shorter than the emitted light path, the emitted light path is not interrupted by the light collection means, and a part of the emitted light path is common to a part of the reflected light path.

2. A compact type bar code reader as claimed in claim 1, wherein the scanning pattern forming means comprises:
    a V-shape polygonal mirror constituted by a lower reflection unit and an upper reflection unit, the lower reflection unit being positioned at the lower portion of the casing, and the upper reflection unit being positioned at the upper portion of the casing.

3. A compact type bar code reader as claimed in claim 2, wherein the lower reflection unit and the upper reflection unit comprise a plurality of reflection surfaces, each of the upper reflection surfaces and lower reflection surfaces being intersected so as to form a V-shape having an intersection angle, and inclined between the upper reflection surfaces and the lower reflection surfaces so as to form an inclination angle.

4. A compact type bar code reader as claimed in claim 2, wherein:
    the V-shape polygonal mirror is manufactured in such a way that the V-shape polygonal mirror is divided into the upper reflection unit and the lower reflection unit,
    each surface of the upper and lower reflection units is separately coated by a metal film evaporated from an evaporation source, and
    the upper and lower reflection units are assembled to each other after evaporation of the metal film.

5. A compact type bar code reader as claimed in claim 4, wherein a division of the upper and lower reflection units is done along a horizontal separation line between the upper reflection unit and the lower reflection unit.

6. A compact type bar code reader as claimed in claim 2, wherein the V-shape polygonal mirror further comprises a polygon motor to rotate the V-shape polygonal mirror, the polygon motor being constituted by a rotation axle, a rotor fixed to the rotation axle, a stator, and a bearing mounted between the rotation axle and the stator, the rotor being mounted to an outer side of the stator, and the upper and lower reflection units being mounted to an outer side of the rotor.

7. A compact type bar code reader as claimed in claim 6, wherein the assembly of the V-shape polygonal mirror and the polygon motor are performed in such a way that the rotation axle is mounted to the stator through the bearing, the rotor is mounted to the rotation axis by a screw, the lower reflection unit is mounted onto the stator, the upper reflection unit is mounted onto the lower reflection unit through a coupling hole and a projection, and a flat spring is mounted to the rotation axis by the screw, and a rubber sheet is provided between the upper reflection unit and the flat spring.

8. A compact type bar code reader as claimed in claim 1, wherein the light reflection means comprises a multi-face reflection mirror constituted by at least two reflection mirrors to form a plurality of directions of the scanning pattern.

9. A compact type bar code reader as claimed in claim 1, further comprising:
   at least two light emission elements, and
   a light reception element,
   wherein the at least two light emission elements and the light reception element are provided in the casing, and arranged in such a way that an article detection area defined by the at least two light emission elements and the light reception element overlap a bar code symbol readable area defined by the laser beam.

10. A compact type bar code reader as claimed in claim 9, wherein the at least two light emission elements are arranged in such a way that a light emission area of a first one of the at least two light emission elements overlaps a light emission area of the second one of the at least two light emission elements.

11. A compact type bar code reader as claimed in claim 1, further comprising:
   a scanning read unit for generating the laser beam, receiving the laser beam reflected from the bar code symbol, and demodulating the reflected laser beam, thereby performing a read operation;
   an article detection unit for generating a detection light for irradiation onto the article, receiving the detection light reflected from the article, and providing an article detection signal; and
   a control unit coupled to the scanning read unit and the article detection unit, for generating an emission stop signal to the article detection unit, receiving an article detection signal from the article detection unit, and generating a scanning start/stop signal to be sent to the scanning read unit, wherein the control unit controls the operation of the scanning read unit and the article detection unit in such a way that the detection light is emitted to the article, the laser beam is started after the article detection signal is received, the detection light is stopped during irradiation of the laser beam, the laser beam is stopped when the read operation is completed, and the detection light is again emitted to detect a next article.

12. A compact type bar code reader as claimed in claim 11, wherein the scanning read unit comprises:
   a laser beam scanner coupled to the control unit, for generating a plurality of scanning patterns of the laser beam,
   a light collection circuit for collecting the laser beam,
   a detector coupled to the light collection circuit, for detecting the laser beam, and
   a demodulation circuit coupled to the detector, for demodulating the reflected laser beam.

13. A compact type bar code reader as claimed in claim 11, wherein the article detection unit comprises:
   a light emission element;
   a light reception circuit element;
   a light change detection circuit coupled to the light reception circuit for detecting the change of the amount of the reception light, and
   a clock pulse generation circuit coupled to the light change detection circuit, for generation clock pulses which are used to obtain a pulsed detection light.

14. A compact type bar code reader as claimed in claim 11, wherein the control unit comprises:
   a central processing unit for controlling the operation of the scanning unit and the article detection unit, and
   a read control time for counting an irradiation time of the laser beam.

15. A bar code reader for detecting a bar code symbol provided on a surface of an article, comprising:
   a laser beam generator having a generation point, for generating a laser beam from the generation point;
   a scanning pattern generator including a substantially V-shaped polygonal mirror and being arranged to receive the laser beam from the generation point, for generating a scanning pattern for irradiation of the bar code symbol;
   a light collector arranged to receive the laser beam reflected from the bar code symbol; and
   a light receptor having a reception point and being arranged to receive the laser beam from said light collector at the reception point, for receiving and transducing the laser beam from said light collector, to generate an output signal,
   a distance travelled by the laser beam from the generation point to the reception point defining a light path,
   a first segment of the light path from the generation point to the bar code symbol being greater than a predetermined value sufficient to ensure accurate detection of the bar code symbol,
   a second segment of the light path from the bar code symbol to the reception point being less than the first segment,
   the first segment being unobstructed by said light collector, and
   a part of the first segment of the light path being common to a part of the second segment of the light path.

* * * * *